(12) United States Patent
Sahin et al.

(10) Patent No.: US 12,081,383 B2
(45) Date of Patent: Sep. 3, 2024

(54) COEXISTENCE OF OFDM AND ON-OFF KEYING (OOK) SIGNALS IN WLAN

(71) Applicant: InterDigital Patent Holdings, Inc., Wilmington, DE (US)

(72) Inventors: Alphan Sahin, Westbury, NY (US); Oghenekome Oteri, San Diego, CA (US); Hanqing Lou, Syosset, NY (US); Xiaofei Wang, Cedar Grove, NJ (US); Li Hsiang Sun, San Diego, CA (US); Rui Yang, Greenlawn, NY (US); Frank La Sita, Setauket, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 16 days.

(21) Appl. No.: 17/499,563

(22) Filed: Oct. 12, 2021

(65) Prior Publication Data
US 2022/0109600 A1 Apr. 7, 2022

Related U.S. Application Data

(63) Continuation of application No. 16/611,187, filed as application No. PCT/US2018/031099 on May 4, 2018, now Pat. No. 11,146,440.

(60) Provisional application No. 62/502,382, filed on May 5, 2017.

(51) Int. Cl.
*H04L 27/26* (2006.01)
*H04L 5/00* (2006.01)

(52) U.S. Cl.
CPC ........ *H04L 27/2697* (2013.01); *H04L 5/0007* (2013.01); *H04L 5/0053* (2013.01); *H04L 27/26035* (2021.01); *H04L 27/2613* (2013.01); *H04L 27/2636* (2013.01); *H04L 27/2666* (2013.01)

(58) Field of Classification Search
None
See application file for complete search history.

(56) References Cited

U.S. PATENT DOCUMENTS

| | | | |
|---|---|---|---|
| 9,585,091 B2 | 2/2017 | Jafarian et al. | |
| 10,129,064 B1 | 11/2018 | Lee et al. | |
| 11,146,440 B2* | 10/2021 | Sahin | H04W 52/0229 |
| 2004/0131078 A1 | 7/2004 | Gupta et al. | |
| 2014/0126432 A1 | 5/2014 | Wang et al. | |
| 2016/0285596 A1 | 9/2016 | Park et al. | |
| 2017/0280498 A1 | 9/2017 | Min et al. | |
| 2018/0091344 A1 | 3/2018 | Azizi et al. | |
| 2018/0092036 A1 | 3/2018 | Azizi et al. | |
| 2018/0183905 A1 | 6/2018 | Azizi et al. | |

(Continued)

OTHER PUBLICATIONS

Agilent Technologies, "Wireless LAN and 60 GHZ—IEEE 802.11ad Explained," pp. 1-28 (May 20, 2013).

(Continued)

*Primary Examiner* — Anh Vu H Ly
(74) *Attorney, Agent, or Firm* — VOLPE KOENIG

(57) ABSTRACT

A wireless transmit/receive unit (WTRU) or access point (AP) may transmit a protocol data unit (PDU) of a first 802.11 protocol and a preamble and data of a second 802.11 protocol. The preamble and data of the second 802.11 protocol may be transmitted on resources of the PDU of the first 802.11 protocol with shaping sequences for concurrent transmission.

16 Claims, 23 Drawing Sheets

(56) References Cited

U.S. PATENT DOCUMENTS

| | | | |
|---|---|---|---|
| 2018/0184378 A1 | 6/2018 | Fang et al. | |
| 2018/0288705 A1* | 10/2018 | Park | H04L 27/20 |
| 2018/0288706 A1* | 10/2018 | Fang | H04L 27/2603 |
| 2018/0288799 A1* | 10/2018 | Min | H04W 74/0808 |
| 2019/0268192 A1 | 8/2019 | Lim et al. | |
| 2019/0357145 A1 | 11/2019 | Lopez et al. | |
| 2019/0364505 A1 | 11/2019 | Wang et al. | |
| 2020/0059342 A1 | 2/2020 | Sahin et al. | |
| 2020/0106651 A1* | 4/2020 | Park | H04W 76/28 |

OTHER PUBLICATIONS

Azizi et al., "A PAR Proposal for Wake-up Radio," IEEE 802.11-16/1045r9 (Nov. 2016).

Chen et al., "MAC and PHY Proposal for 802.11af," IEEE 802.11-10/0258r0 (Mar. 2010).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHZ, IEEE P802.11ac/D1.0 (May 2011).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D1.2 (Apr. 2017).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D2.2 (Feb. 2018).

Halasz, "Sub 1 GHz license-exempt PAR and 5C," IEEE P802.11 Wireless LANs, IEEE 802.11-10/0001r13 (Jul. 2010).

Huang, "Specification Framework for TGba," IEEE 802.11-17/0575r10 (Mar. 19, 2018).

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE Standard for Information technology—Telecommunications and information exchange between systems—Local and metropolitan area networks - Specific requirements; Part 11: Wireless LAN Medium Access Control (MAC) and Physical Layer (PHY) Specifications, IEEE Std. 802.Nov. 2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).

Jia et al., "Performance Investigations on Single-carrier and Multiple-carrier-based WUR," IEEE 802.11-17/0373r1 (Mar. 16, 2017).

Park et al., "LP-WUR (Low-Power Wake-Up Receiver) Follow-Up," IEEE 802.11-16/0341r0 (Mar. 14, 2016).

Sahin et al., "On the Coexistence of 802.11ax and 802.11ba Signals," IEEE 802.11-17/0659r1 (May 8, 2017).

Sahin et al., "Performance Evaluation of OOK Waveform Coding Schemes with Impairments," IEEE 802.11-17/1037r3 (Jul. 10, 2017).

Sun et al., "IEEE 802.11 TGay Use Cases," IEEE 802.11-2015/0625r2 (May 2015).

Wilhelmsson et al., "Concurrent transmission of data and a wake-up signal in 802.11ax," IEEE 802.11-17/0094r1 (Jan. 15, 2017).

Wilhelmsson et al., "Concurrent transmission of data and a wake-up signal in 802.11ax—Follow-up," IEEE 802.11-17/0385r0 (Mar. 13, 2017).

Yu et al., "WUR Usage Model Document," IEEE 802.11-17/0029r10 (Sep. 13, 2017).

Wei et al., "Packet Design for Wake-up Receiver (WUR)," IEEE 802.11-17/0066r0 (Jan. 10, 2017).

* cited by examiner

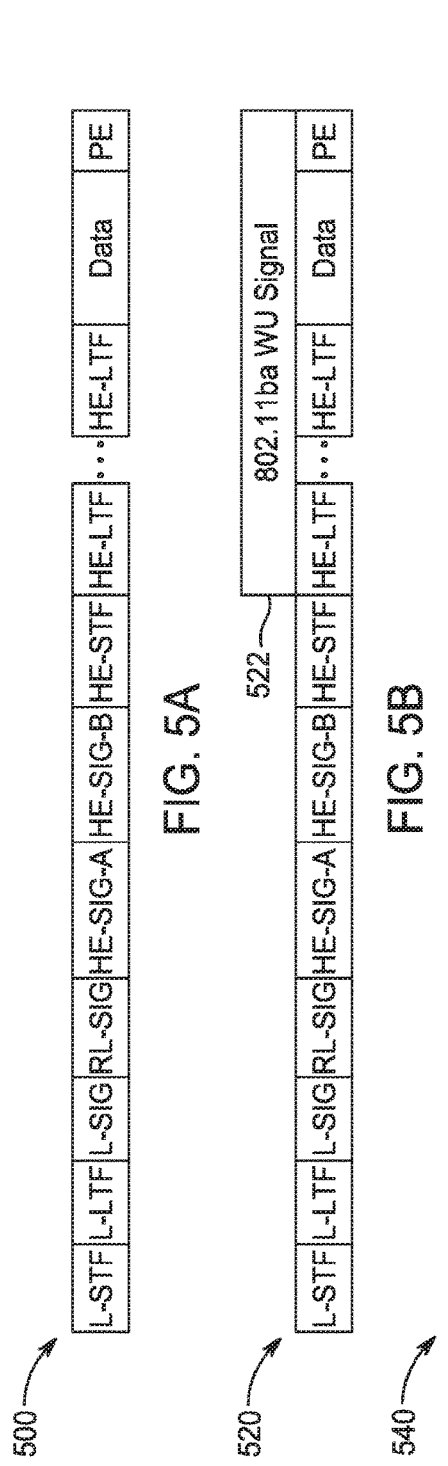
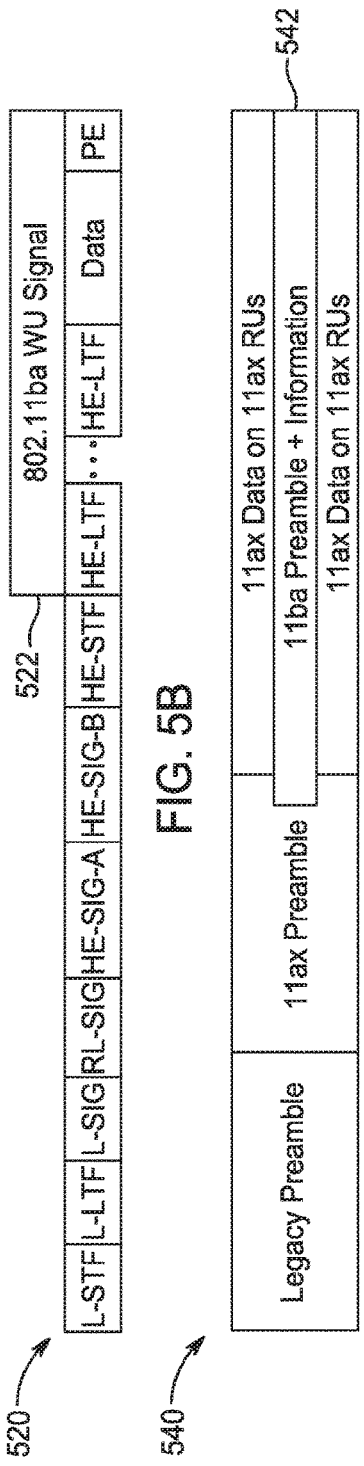
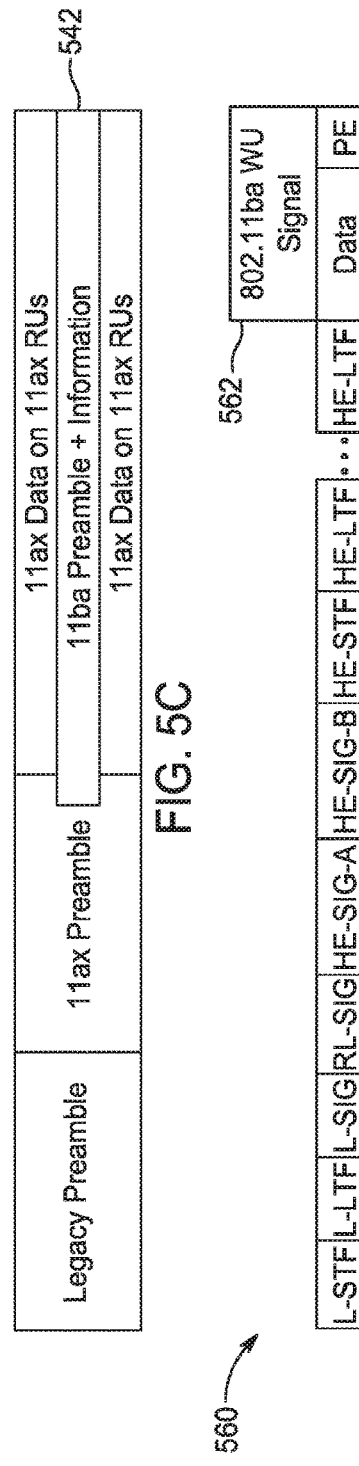
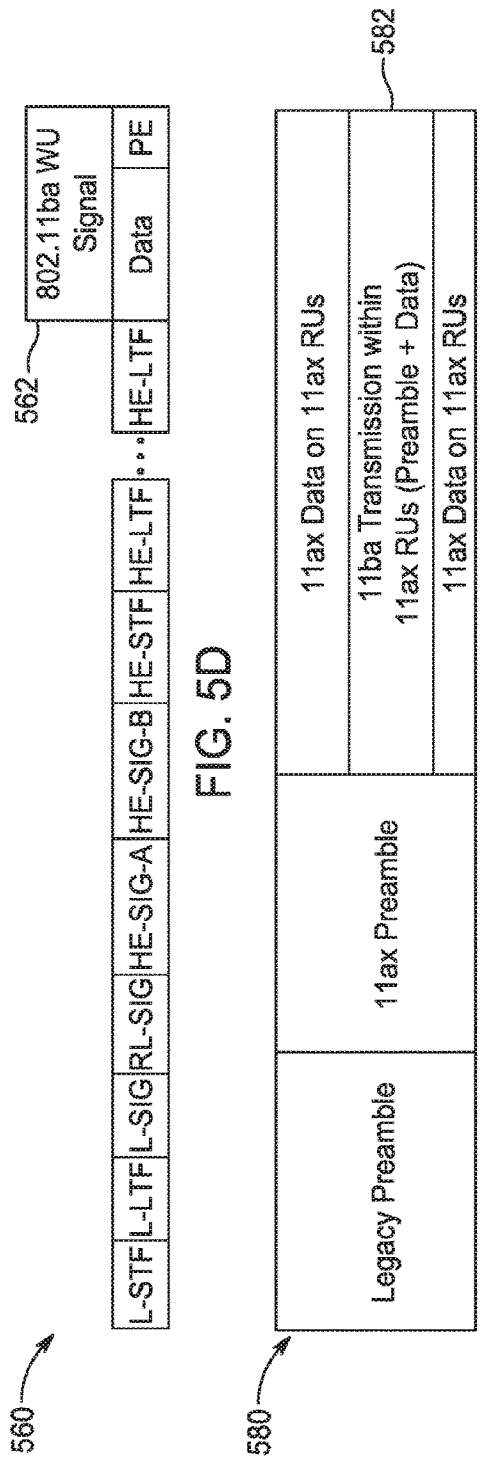

COEXISTENCE OF OFDM AND ON-OFF KEYING (OOK) SIGNALS IN WLAN

CROSS REFERENCE TO RELATED APPLICATIONS

This application is a continuation of U.S. patent application Ser. No. 16/611,187 filed Nov. 5, 2019, which issued as U.S. Pat. No. 11,146,440 on Oct. 12, 2021, which is the U.S. National Stage, under 35 U.S.C. § 371, of International Application No. PCT/US2018/031099 filed May 4, 2018, which claims the benefit of U.S. Provisional Application No. 62/502,382 filed May 5, 2017, the contents of which is hereby incorporated by reference herein.

BACKGROUND

Fixed or low mobility wireless communication for local area networks (LANs) utilize technologies such as the Institute of Electrical and Electronics Engineers (IEEE) 802.11a, 802.11b, 802.11g, 802.11n, 802.11ac, 802.11ax, or generally 802.11x. These technologies relate to medium access control (MAC) and physical layer (PHY) specifications for creating wireless LANs (WLANs). With the growth of WLANs, it may be desirable to transmit signals in the same transmission for a number of types of WLAN interfaces to achieve desired performance and spectral efficiency. Collectively, these technologies are often referred to as WiFi.

SUMMARY

Transmitting or receiving concurrent 802.11 data or control in the same transmission is described. An access point (AP) or station (STA) may transmit or receive a multiplexed signal including 802.11 data or control protocol data units (PDUs). The AP or STA may multiplex the 802.11 data or control within one orthogonal frequency division multiplexing (OFDM) symbol length. The AP or STA may include a cyclic prefix of varying length in the transmission.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 5A is an example of an HE MU PPDU format for 802.11ax;

FIG. 5B is an example of 802.11ax HE MU PPDU format transmitted with 802.11ba after an HE long training field (HE-LTF) in the HE-preamble;

FIG. 5C is an example of 802.11ax and 802.11ba coexistence with transmission after the HE-LTF in the HE-preamble;

FIG. 5D is an example of an 802.11ax HE MU PPDU format transmitted with 802.11ba after the HE-preamble;

FIG. 5E is an example of 802.11ax and 802.11ba coexistence with transmission after the HE-preamble;

DETAILED DESCRIPTION

Figure 1A:
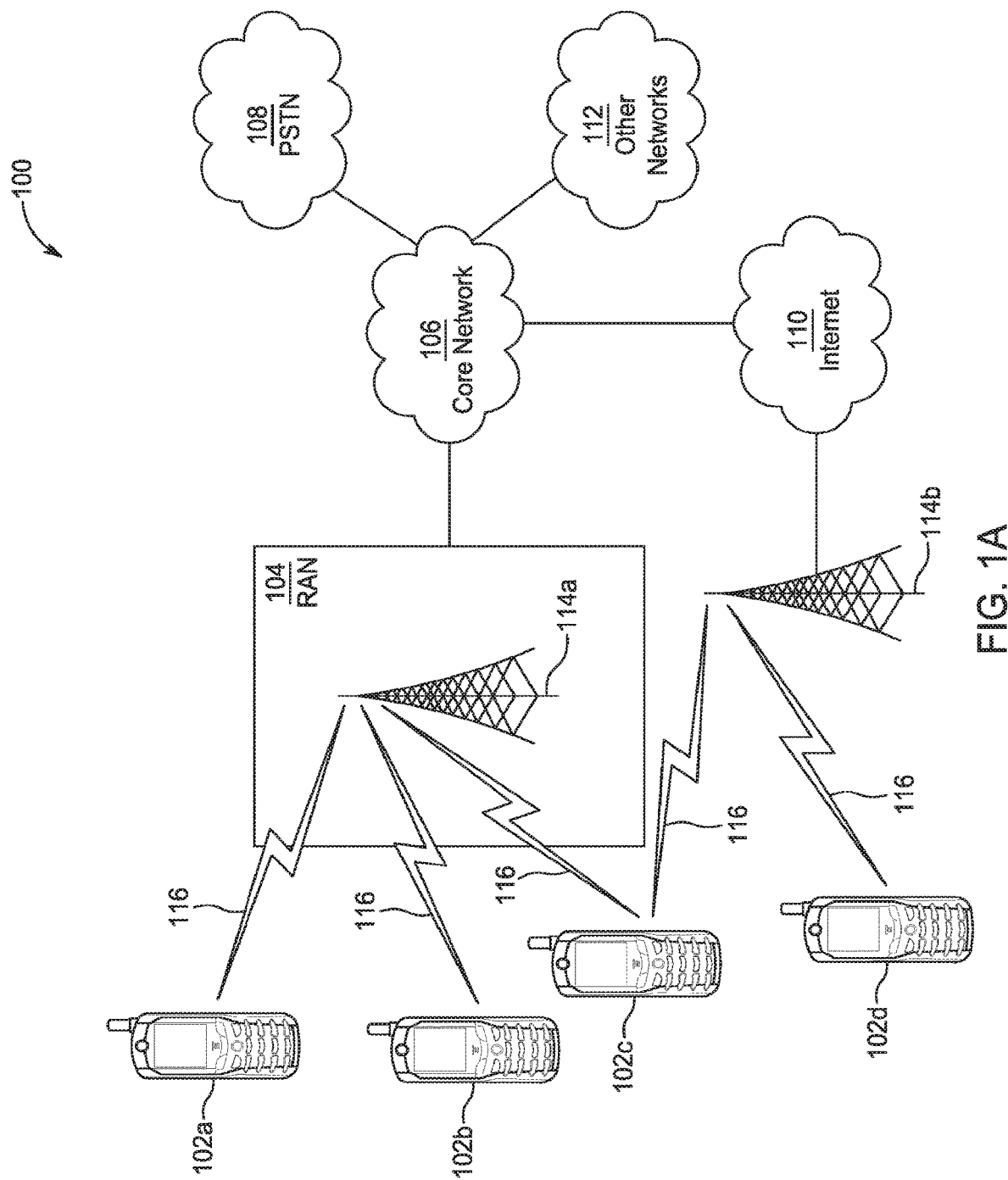
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform spread orthogonal frequency division multiplexing (ZT UW DTS-s OFDM), unique word OFDM (UW-OFDM), resource block-filtered OFDM, filter bank multi-carrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a next generation node b (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or communications sent to/from multiple types of base stations (e.g., an eNB and a gNB).

In other embodiments, the base station 114a and the WTRUs 102a, 102b, 102c may implement radio technologies such as Institute of Electrical and Electronics Engineers (IEEE) 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The other networks 112 may include wired and/or wireless communication networks owned and/or operated by other service providers. For example, the other networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
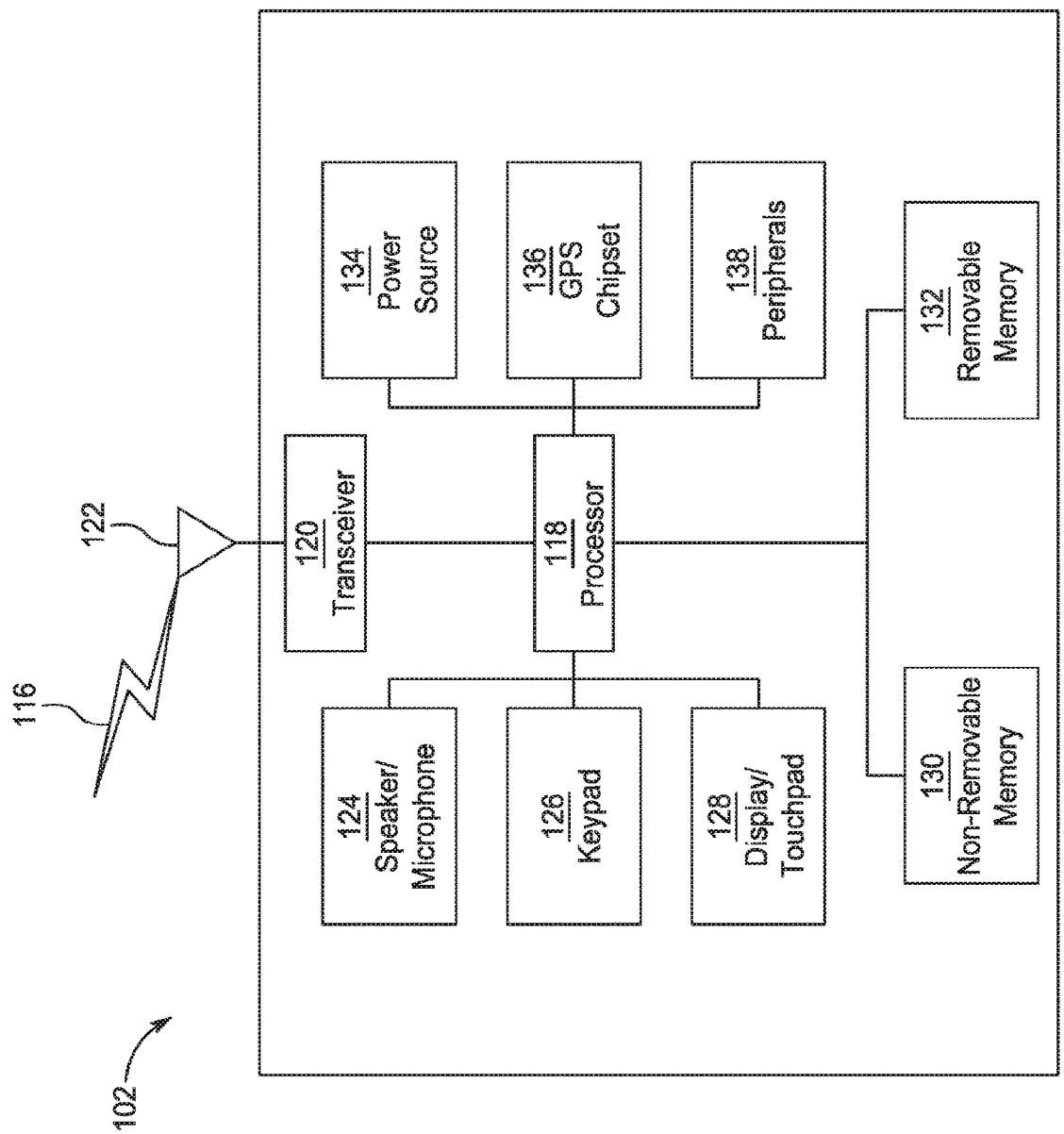
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, a humidity sensor, or the like.

The WTRU 102 may include a full duplex radio for which transmission and reception of some or all of the signals (e.g., associated with particular subframes for both the UL (e.g., for transmission) and downlink (e.g., for reception) may be concurrent, simultaneous, or the like. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
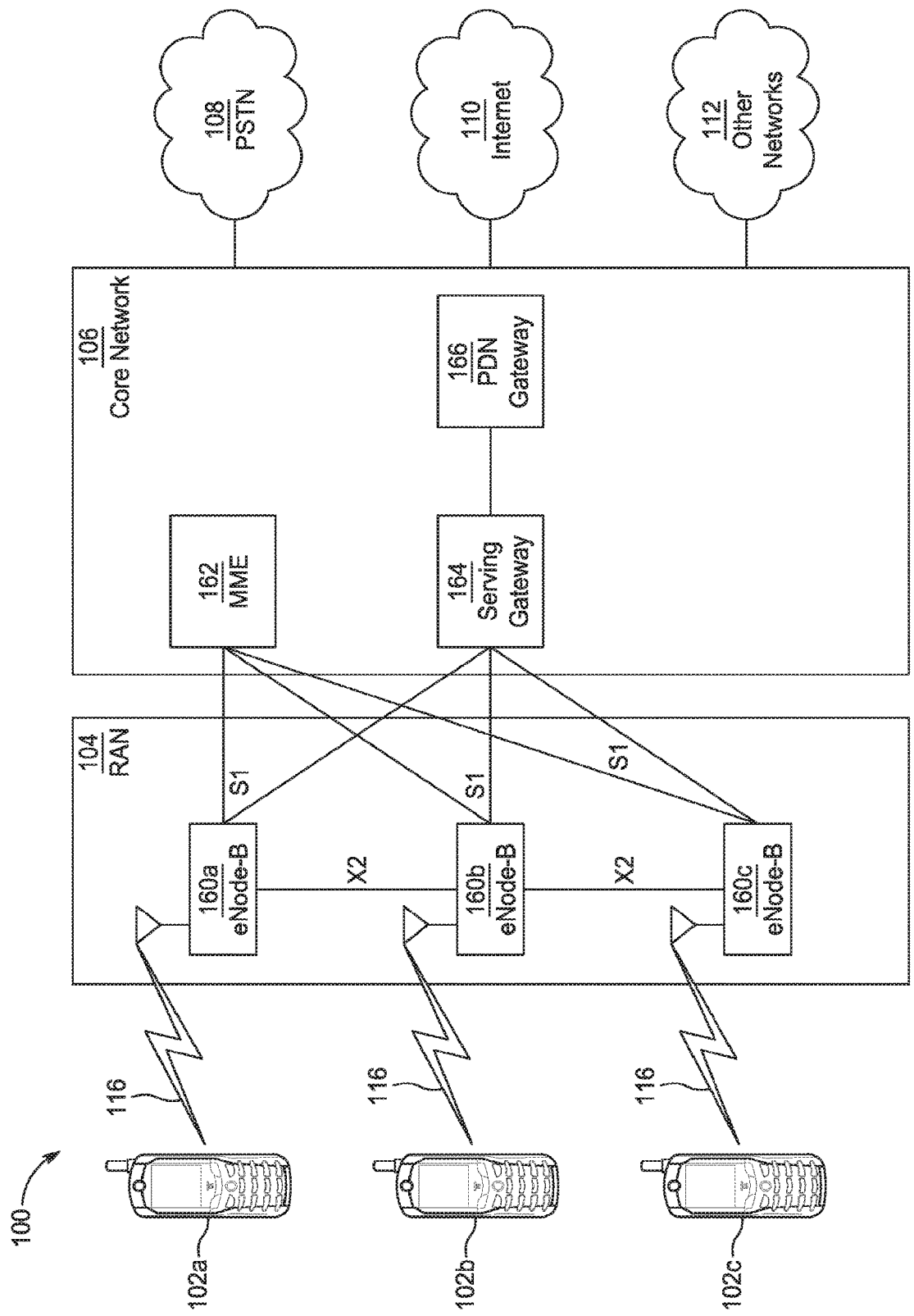
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other networks 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may also be referred to as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width, set via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing or time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 gigahertz (GHz) modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communication (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, due to a STA, such as a 1 MHz operating mode STA, transmitting to the AP, whole frequency bands may be considered busy even though a majority of frequency bands remain idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
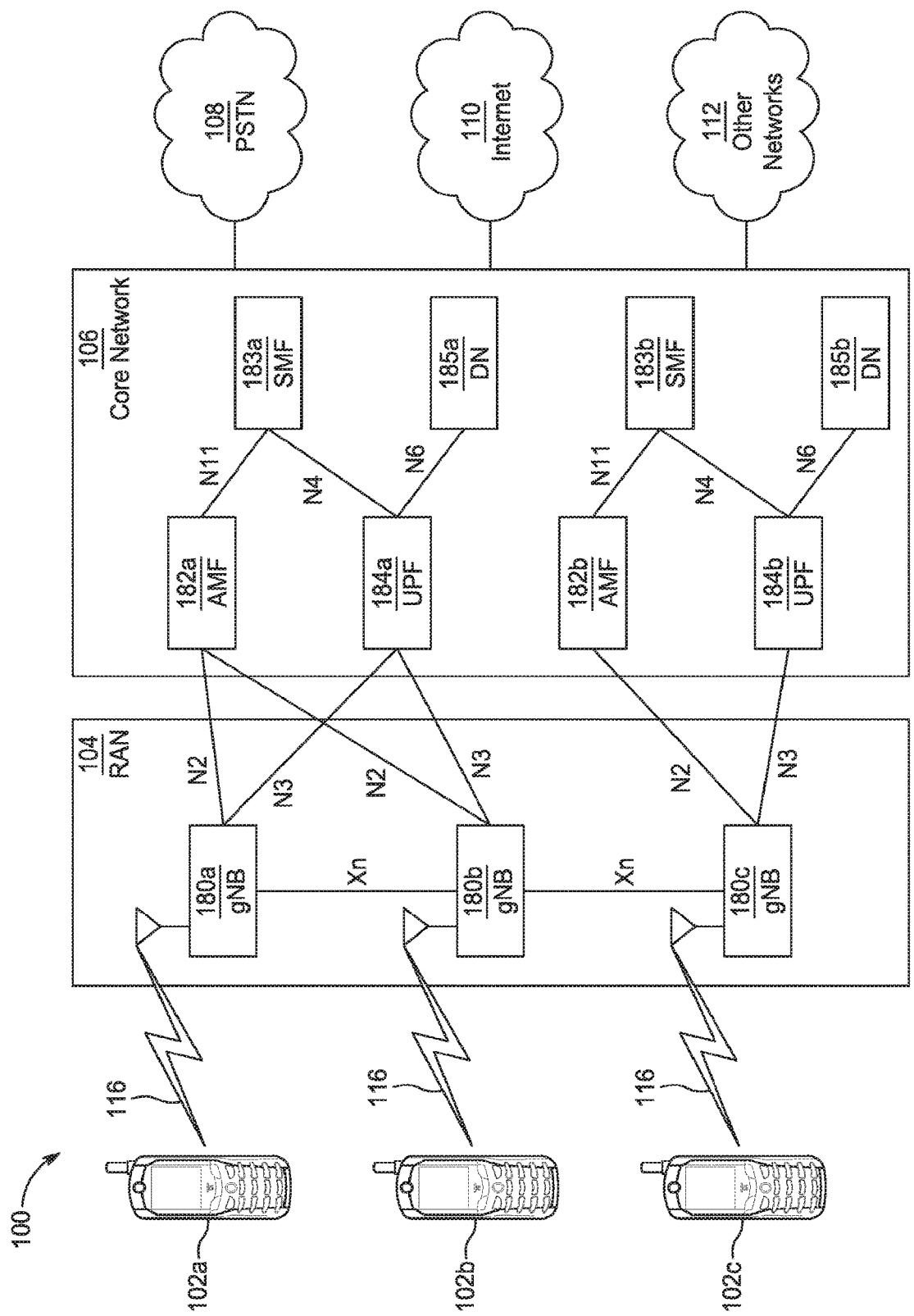
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. Also, in an example, gNBs 180*a*, 180*b*, 180*c* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers (not shown) to the WTRU 102*a*. A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated communications from gNB 180*a* and gNB 180*b* (and/or gNB 180*c*).

The WTRUs 102*a*, 102*b*, 102*c* may communicate with gNBs 180*a*, 180*b*, 180*c* using communications associated with a scalable numerology. For example, the OFDM symbol spacing and/or OFDM subcarrier spacing (SCS) may vary for different communications, different cells, and/or different portions of the wireless communication spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration, WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communication (URLLC) access, services relying on enhanced massive mobile broadband (eMBB) access, services for MTC access, and/or the like. The AMF 182a, 182b may provide a control plane function for switching between the RAN 104 and other RANs (not shown) that employ other radio technologies, such as LTE, LTE-A, LTE-A Pro, and/or non-third generation partnership project (3GPP) access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples are given herein for communicating two different formats or types of 802.11 information, data, or control substantially concurrently or concurrently by WTRU, AP, STA, or the like. Concurrent transmission may increase utilization or efficiency of spectrum or resources. Although 802.11 is used in the examples described herein, concurrent transmission or multiplexing of different radio access technologies may similarly be adapted for the examples, techniques, or operations given herein. In NR, LTE, LTE-A, LTE-pro, or the like, OFDMA or discrete Fourier transform (DFT)-spread OFDM transmissions may multiplex coded wake-up (WU) signals, such as Manchester-coded on-off keying (OOK) signals, and data signals in the frequency domain. The WU signal may be transmitted over several resource blocks and the corresponding signal in the time domain may be coded OOK symbols, or pulse position modulation. Since the coded OOK symbols may be generated through several resources block, the contamination or interference on the adjacent subcarriers may be avoided, and orthogonality between WU signals and the data symbols may be maintained.

For concurrent 802.11 transmissions, a WLAN in infrastructure BSS mode may have an AP for the BSS and one or more stations STAs associated with the AP. A STA or AP may comprise a device embodied in hardware similar to that of a WTRU as described herein. The AP may have access or interface to a DS or another type of wired/wireless network that may carry traffic in and out of the BSS. Traffic for STAs that originates from outside the BSS may arrive through the AP and be delivered to the STAs. Traffic originating from STAs to destinations outside the BSS may be sent to the AP to be delivered to respective destinations. Traffic between STAs within the BSS may also be sent through the AP where the source STA sends traffic to the AP and the AP delivers the traffic to the destination STA. Such traffic between STAs within a BSS may also be configured for peer-to-peer traffic. Peer-to-peer traffic may also be sent directly between the source and destination STAs with a DLS using an 802.11e DLS or an 802.11z TDLS. A WLAN using IBSS mode may have no AP, and/or STAs, communicating directly with each other, such as in an ad-hoc communication mode.

To improve spectral efficiency, 802.11ac may be configured to utilize downlink Multi-User MIMO (MU-MIMO) transmission to multiple STAs in a same symbol's time frame such as during a downlink OFDM symbol. 802.11ah may also use downlink MU-MIMO, and as in 802.11ac, use the same symbol timing to multiple STA's. These transmissions may occur with minimal interference between multiple STA's. To further mitigate any interference, STA's utilizing MU-MIMO transmission with the AP may be configured to use the same channel or band, which may limit the operating bandwidth to the smallest channel bandwidth that is supported by the STA's included in the MU-MIMO communication with the AP.

In some configurations, 802.11ax may utilize OFDM for data in physical layer convergence procedure (PLOP) protocol data units (PPDUs) with a discrete Fourier transform (DFT) period of 12.8 μs, a SCS of 78.125 kHz, and/or 20 MHz bandwidth. 802.11ax may also utilize OFDMA technology that allows multiple users sharing available channels. The smallest bandwidth that each user may occupy in a channel may be a resource unit (RU), which may include 26, 52, 106, 242, 484, 996 or 2×996 tones. Distribution of RUs in a channel may be based on channel bandwidth.

Figure 2:
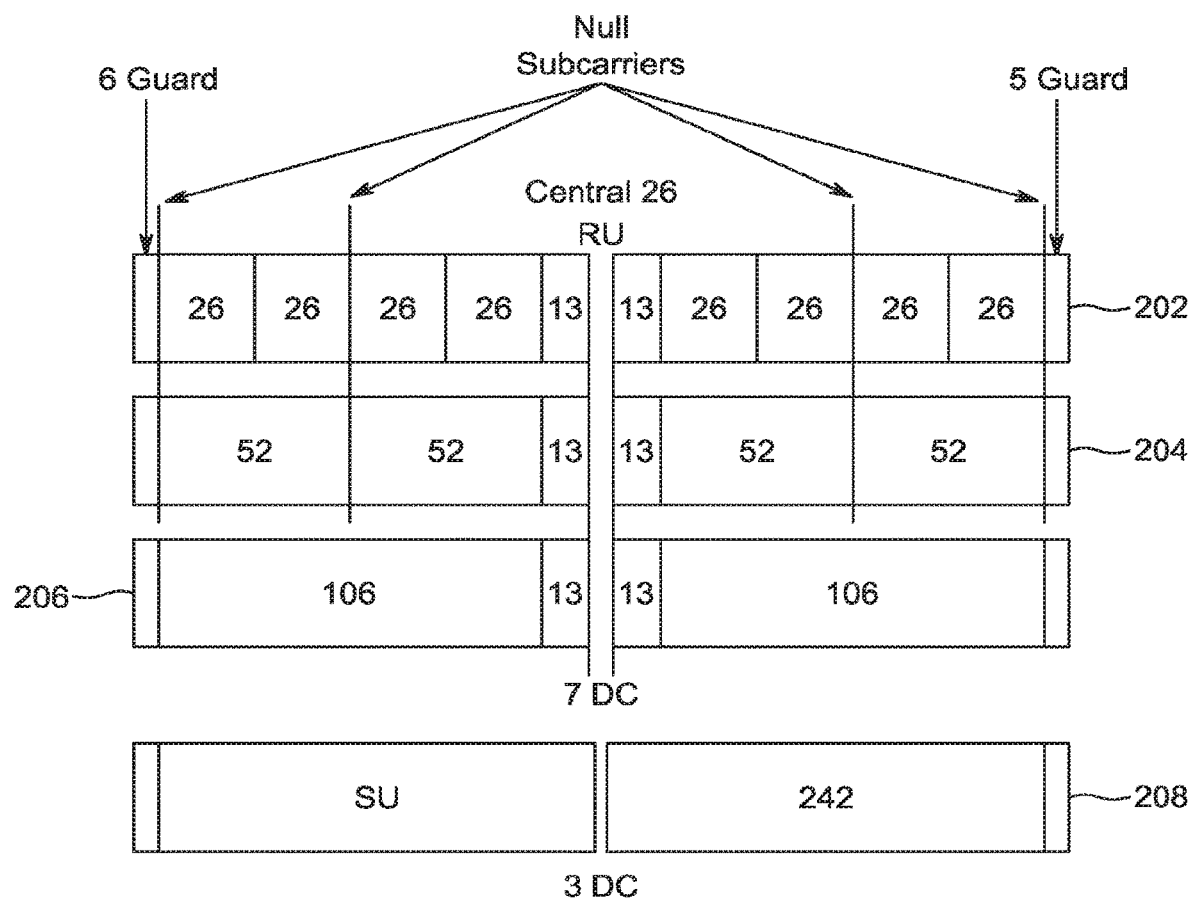
FIG. 2 is an example of RUs in a 20 MHz channel for an 802.11ax physical layer convergence procedure (PLOP) protocol data unit (PPDU)

FIG. 2 is an example of RUs in a 20 MHz channel for an 802.11ax PPDU. For 202, a pattern of 6 guard tones, null subcarriers, 26 tones, 26 tones, null subcarriers, 26 tones, 26 tones, 2×13 of central 26 tones separated by 7 DC tones, 26 tones, 26 tones, null subcarriers, 26 tones, 26 tones, null subcarriers, and 5 guard tones may be configured as a RU. For 204, a pattern of 6 guard tones, null subcarriers, 52 tones, null subcarriers, 52 tones, 2×13 of central 26 tones separated by 7 DC tones, 52 tones, null subcarriers, 52 tones, null subcarriers, and 5 guard tones may be configured as a RU. For 206, a pattern of 6 guard tones, null subcarriers, 106 tones, 2×13 of central 26 tones separated by 7 DC tones, 106 tones, and 5 guard tones may be configured as a RU. Lastly, for 208 for a single user (SU) a pattern of 6 guard tones, 242 tones, 3 DC tones, 242 tones, and 5 guard tones may be configured as a RU.

Figure 3:
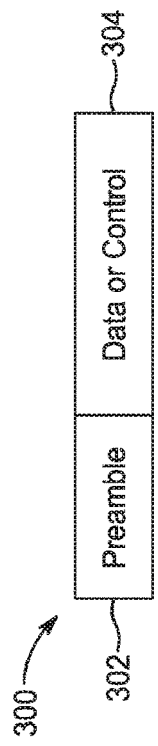
FIG. 3 is an example of a PDU for transmissions or communication given herein.
Figure 3A:
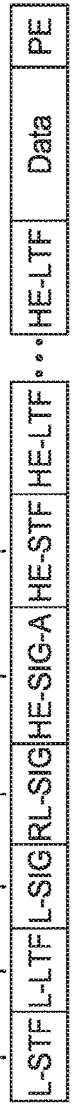
FIG. 3A is an example of an high efficiency (HE) single user (SU) PPDU format.
Figure 3B:
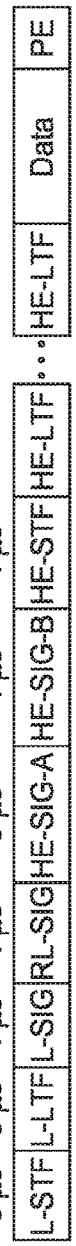
FIG. 3B is an example of an HE multi-user (MU) PPDU format.

FIG. 3 is an example of a PDU 300 for transmissions and communication given herein. PDU 300 may include a preamble portion 302 and a data or control portion 304. In FIG. 3A, an example of a high efficiency (HE) SU PPDU format 310 is given. In 310, the HE SU PPDU may include an 8 μs legacy short training field (L-STF), 8 μs legacy long training field (L-LTF), 4 μs legacy signal (L-SIG) field, 4 μs repeated legacy SIG (RL-SIG) field, 8 μs HE-SIG-A field, 4 μs HE-STF, variable length HE-LTFs, data, and a packet extension (PE) field. In FIG. 3A or other examples herein, a duration or length (e.g., 4 μs, 8 μs, etc.) is given as an example and any duration may be configured or utilized to meet desired performance or functions. In addition, FIG. 3B is an example of a HE MU PPDU format 320. In 320, the HE MU PPDU may include an 8 μs L-STF, 8 μs L-LTF, 4 μs L-SIG field, 4 μs RL-SIG field, 8 μs HE-SIG-A field, 4 μs HE-SIG B field, 4 μs HE-STF, variable length HE-LTFs, data, and a PE field.

Figure 3C:
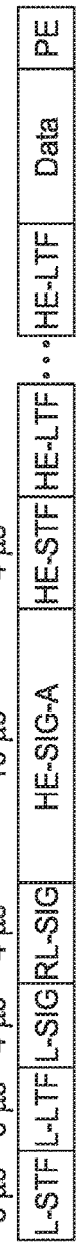
FIG. 3C is an example of an HE extension range (ER) PPDU format.
Figure 3D:
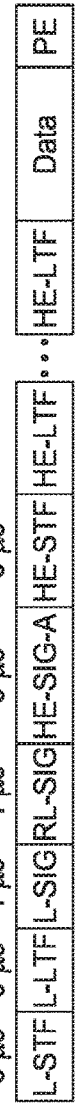
FIG. 3D is an example of HE trig based (TB) PPDU format.

FIG. 3C is an example of an HE extension range (ER) SU PPDU format 340. In 340, the HE ER SU PPDU may include an 8 μs L-STF, 8 μs L-LTF, 4 μs L-SIG field, 4 μs RL-SIG field, 16 μs HE-SIG-A field, 4 μs HE-STF, variable length HE-LTFs, data, and a PE field. FIG. 3D is an example of HE trig based (TB) PPDU format 360. In 360, the HE TB PPDU may include an 8 μs L-STF, 8 μs L-LTF, 4 μs L-SIG field, 4 μs RL-SIG field, 8 μs HE-SIG-A field, 8 μs HE-STF, variable length HE-LTFs, data, and a PE field.

Figure 4:
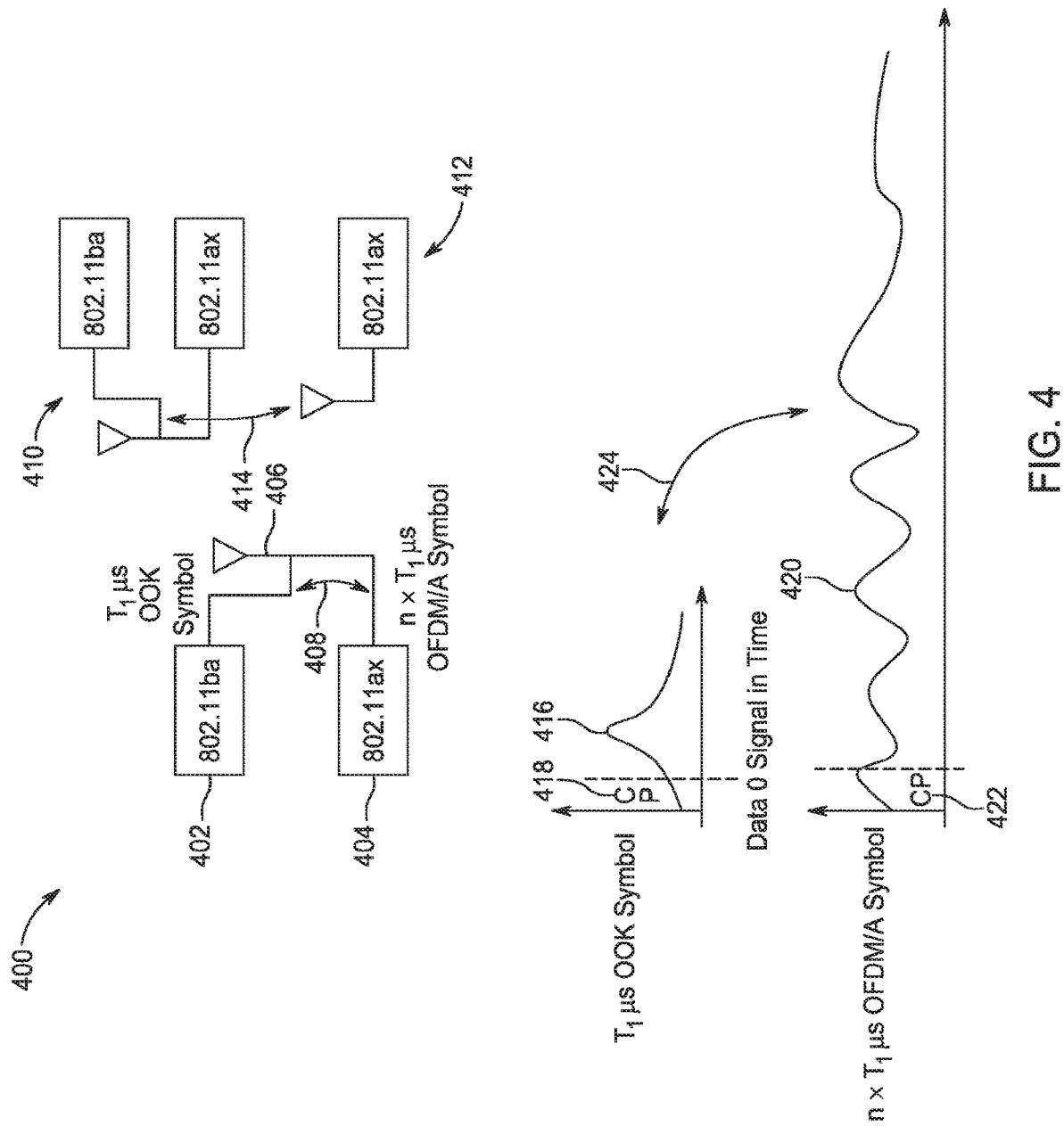
FIG. 4 is an example of coexistence of 802.11ax and 802.11ba.

FIG. 4 is an example of coexistence of 802.11ax and 802.11ba. 802.11ba devices may utilize a wake-up radio (WUR) and may be configured to meet certain range, capability, coexistence, power consumption, latency, or the like metrics. 802.11ba devices may also use OOK modulation for a payload portion of a WU frame or packet. The OOK waveform of the WU frame or packet may be generated by populating a certain number of 802.11 OFDM subcarriers.

For range, the 802.11ba WUR may be a companion radio to the primary connectivity radio, such as an 802.11ax radio or device, that meets similar range metrics as the primary connectivity radio. WU frames may carry control information that may trigger a transition of the primary connectivity radio out of sleep, idle, or the like modes or states. For coexistence, WUR devices may coexist with legacy IEEE 802.11 devices in the same band. For power consumption, WUR devices may have a low target active receiver power consumption. For instance, less than one milliwatt (mW) may be desired for low power, battery operated, or wirelessly powered devices such as in IoT or MTC applications in healthcare, smart homes, sensors, industrial sensors, wearables, warehousing, fulfilment centers, user data and sensor coexistence, or the like.

For latency, power efficient configurations may be utilized for low power, battery operated, or wirelessly powered devices while maintaining low latency. For example, an OFDM active receiver that consumes tens to hundreds of mWs may reduce power consumption by utilizing power save modes. The longer devices remain in a power save mode, sleep state, or the like, the lower power may be consumed but at an increased latency of data reception.

In 802.11ax, an OFDM symbol duration may be 12.8 µs and cyclic prefix (CP) sizes of 0.8, 1.6, and, 3.2 µs may be utilized. In 802.11ba, an OOK symbol duration may be shorter than 12.8 µs, such as 3.2 µs, to be compatible with 802.11n or 802.11ac numerology. In this configuration, the numerologies for 802.11ba and 802.11ax may be incompatible. However, an 802.11ba numerology configured to account for the 802.11ax numerology may provide compatibility and operate with different CP sizes.

In addition, when 802.11ax is configured with OFDMA, data symbols for different STAs may be multiplexed in frequency for one OFDM symbol duration. In FIG. 4, an 802.11ax PPDU for a T1 µs OOK symbol transmission by 802.11ax component 404 and an 802.11ba PPDU for an n×T1 µs OFDM/A symbol transmission by component 802.11ax component 402 of STA 400 may be transmitted simultaneously or concurrently. Due to lack of orthogonality 408, interference 414 may occur between STAs 410 and 412 receiving PPDUs from antenna 406 in different RUs. In this example, T1 µs OOK symbol 416 may have CP 418 and T1 µs OFDMA symbol 420 may have CP 422. It is desirable to have symbol orthogonality or quasi-orthogonality between symbols 424.

Communicating or multiplexing two different formats or types of 802.11 information, data, or control substantially concurrently or concurrently is given herein. Although 802.11 is used for examples, concurrent transmission or multiplexing of different radio access technologies may similarly be adapted for the techniques or operations given herein. In certain configurations, 802.11ba information, data, or control may be transmitted concurrently with 802.11ax. In such a transmission or communication, DFT-based shaping sequences for 802.11ba signals may be multiple shaped symbols may be utilized. Other configurations such as variable 802.11ax symbol durations with 802.11ba symbols, CPs, preamble padding, blank-symbol insertion, edge transmission, or the like may also be utilized.

An 802.11ba transmission may be configured as part of an 802.11ax HE-MU PPDU transmission. As an example, an 802.11ax signal may be transmitted using OFDMA and the 802.11ba PPDU may be generated by using one or multiple RUs in the 802.11ax signal. To avoid interference between 802.11ax and 802.11ba portions, the 802.11ba signal may be generated in a manner that ensures unused RUs within the 802.11ax transmission are utilized.

FIG. 5A is an example of an HE MU PPDU format for 802.11ax. In 500, the HE MU PPDU may include a L-STF, L-LTF, L-SIG field, RL-SIG field, HE-SIG-A field, HE-SIG-B field, HE-STF, one or more HE-LTF, data, and a PE field. FIG. 5B is an example of an 802.11ax HE MU PPDU format transmitted with 802.11ba after an HE-STF in the HE-preamble. In 520, an 802.11ax HE MU PPDU may include an 802.11ba WU signal 522 concurrently with a L-STF, L-LTF, L-SIG field, RL-SIG field, HE-SIG-A field, HE-SIG-B field, HE-STF, one or more HE-LTF, data, and PE.

FIG. 5C is an example of 802.11ax and 802.11ba coexistence with transmission after the HE-LTF in the HE-preamble. In this configuration, the variable overhead of one or more HE-LTF symbols, which may be precoded or allocated to a specific device, may be reduced. Frame or packet 540 may include a legacy preamble, 11ax preamble, and 11ax data on 11ax RUs concurrently with 11ba preamble and information 542. In certain configurations herein, CP size or OFDM symbol duration may vary in the HE-LTF. In addition, for compatible transmission or multiplexing of 802.11ax and 802.11ba information, data, or control 4×HE-LTF may be utilized when WUR transmission is desired or a 3.2 µs CP duration may be utilized for WUR transmission during the 802.11ax preamble transmission.

FIG. 5D is another example of an 802.11ax HE MU PPDU format transmitted with 802.11ba after the HE-preamble. As opposed to 520, in 560 the 802.11ba WU signal or packet, that may partially start at or overlap with the WUR preamble, may start after the entire HE-preamble. In 560, the preamble may end at the last HE-LTF. The configuration in 560 may allow an 802.11ax receiver to read the HE-SIG-B field and identify resources allocated for the STA.

FIG. 5E is an example of 802.11ax and 802.11ba coexistence with transmission after the HE-preamble. As opposed to 540, 11ba transmission within 11ax RUs that may include preamble and data 582 configured in 580. In FIGS. 5D and 5E the WUR signal may be sent for the duration of the 802.11ax signal. Also, in this configuration to ensure frequency domain orthogonality or quasi-orthogonality between bands while substantially maintaining existing 802.11ba receiver architecture, a bandpass filter may be utilized before WUR envelope detection. The number of RUs allocated to the WUR signal may depend on bandpass filter sensitivity. For instance, a signal may include an additional 26 tone RUs allocated as guard bands for filters that have lower sensitivity. Moreover, this configuration may utilize a setup procedure between the transmitter and WUR receiver to identify the number of RUs to be allocated and the bandwidth of the corresponding WUR signal.

When the WUR signal is generated as a CP OFDM signal to ensure orthogonality or quasi-orthogonality with the 802.11ax data on other RUs, a band-pass filter may be unnecessary. Additionally, within each OFDM symbol, it may be desirable for the WUR signal to have a CP to ensure that the signal may be transformed to the frequency domain using simple inverse DFT (IDFT) or FFT processing by 802.11ax receivers. However, this configuration may reduce the useful duration of the WUR signal and may need signaling of guard intervals, such as G1 or G2, based on the size of the OFDMA symbol.

To reduce the effect of the WUR signal on the processing of 802.11ax signals, the WUR signal may be blanked or not transmitted if it falls within a time duration of a CP. For transmission without guard intervals or periods within an OFDM symbol, the length of the OOK signals may be modified such that an integer number of signals fit within an OFDM symbol duration.

Figure 6:
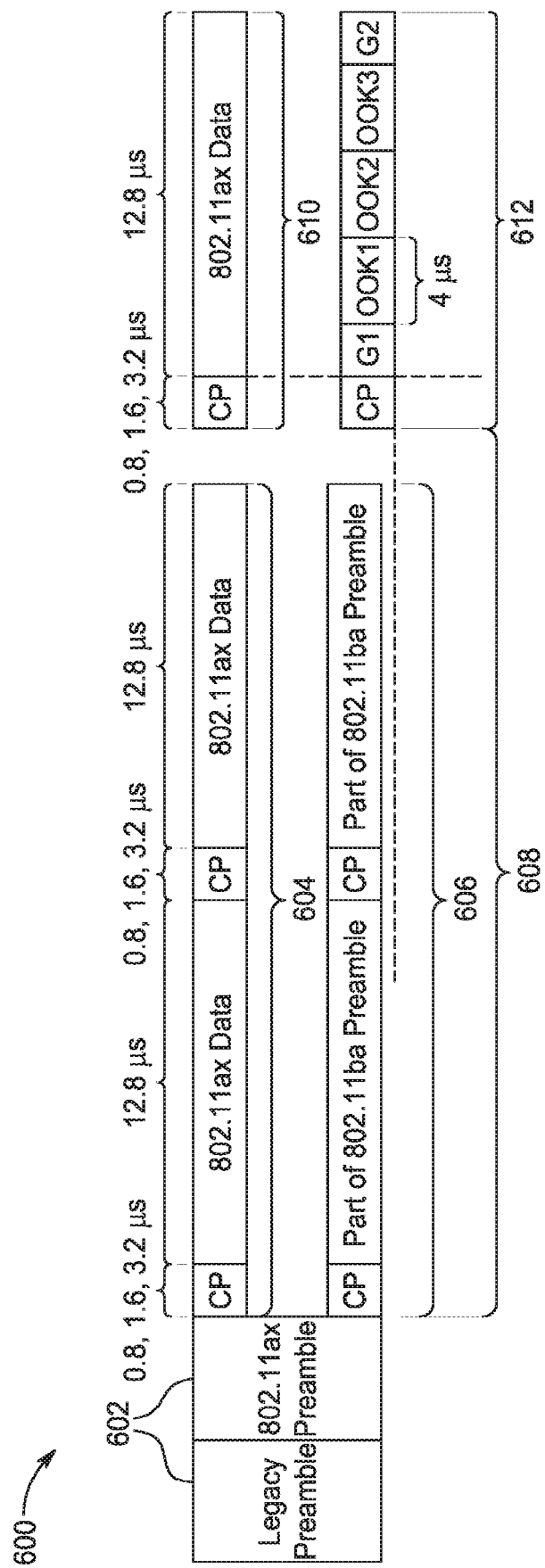
FIG. 6 is an example of an 802.11ba PDU for transmission on 802.11ax resource units (RUs)

FIG. 6 is an example of an 802.11ba PDU for transmission on 802.11ax RUs 600. As explained herein, the configuration in 600 may provide frequency orthogonality or quasi-orthogonality of the 802.11ba and 802.11ax signals. In 600, a frame or packet may include a legacy preamble and 802.11ax preamble 602 and an 802.11ax portion 604 and 802.11ba portion 606 in preamble 608. Also, in 600 an 802.11ba PPDU may be transmitted during the payload duration of 802.11ax.

During an 802.11ba WUR configuration or setup, an STA may receive configuration information from the AP that may include setup for WUR in non-802.11ax coexistence mode, setup for WUR in 802.11ax coexistence mode, or STA specific preamble sequences and resources to scan for a sequence. For example, the sequence may be [1 0 1 0, 0 1 0 0, 1 0 1 1, 1 0 1 1, 0 0 0 1, 0 1 1 1, 0 0 1 1, 1 0 0 0], or the 2's complement of this sequence. The repetition of this sequence may indicate different data rates for WUR or other PHY modes. In the 802.11ax coexistence mode the WUR RU allocation for scanning may coincide with the resources allocated for the non-coexistence mode. A WUR device or receiver may be configured to scan more than one resource or scan a specific band or RU continuously for its WUR signal. In addition, a WUR may scan multiple pre-set bands to identify possible WU signals from the AP. A WU signal, which may include the WU preamble and the WU payload, may be generated by turning on and off a plurality of the RUs of the payload of 802.11ax by frequency-shift keying (FSK) or OOK in time. The RUs used for a WU signal may be contiguous or non-contiguous.

The 802.11ax portion 604 may comprise a 0.8 µs CP, 1.6 µs CP, or 3.2 µs CP, 802.11ax data of duration 12.8 µs, another 0.8 µs CP, 1.6 µs CP, or 3.2 µs CP, and more 802.11ax data of duration 12.8 µs. The 802.11ba portion 606 may comprise a 0.8 µs CP, 1.6 µs CP, or 3.2 µs CP, part of an 802.11ba preamble of duration 12.8 µs, another 0.8 µs CP, 1.6 µs CP, or 3.2 µs CP, and another part of an 802.11ba preamble of duration 12.8 µs. In addition, part 610 may comprise an 0.8 µs CP, 1.6 µs CP, or 3.2 µs CP and 802.11ax data of duration 12.8 µs. Part 612 may comprise an 0.8 µs CP, 1.6 µs CP, or 3.2 µs CP, guard interval G1, OOK1 data of duration 4 µs, OOK2 data of duration 4 µs, OOK3 data of duration 4 µs, and guard interval G2. In FIG. 6, duration or lengths 0.8 µs, 1.6 µs, or 3.2 µs are given as examples and any duration may be configured or utilized to meet desired performance or functions.

In 600, WUR signal parameters such as signal length, CP length, or guard interval may be utilized in the setup for WUR in coexistence mode. These parameters may allow the WUR device or receiver to identify the CP length in coexistence mode, discard un-needed information, or the like. When the WUR signal length is undefined or variable, the length of the guard intervals within the OFDM symbol length, such as G1 or G2, may also be configured. In addition, an STA specific sequence may be different from the sequence allocated during the non-coexistence mode to enable the STA to identify CPs to drop or to account for blank transmissions.

Moreover, an 802.11ax capable AP may avoid transmission on RUs or channels used by 802.11ba by disabling or disqualifying one or more specific RUs for 802.11ax data or control transmission. The one or more specific RUs may be signaled in the HE-SIG-B field of the 11ax preamble. As an example, the HE-SIG-B field may indicate that the RU is empty or indicate that the RU may be utilized for a WUR signal. In certain configurations, 802.11ax receivers may be blind to the transmission of the WUR signal.

When an 802.11ba PPDU is generated utilizing one or more RUs of 802.11ax, an 802.11ba signal bandwidth less than a reserved or allocated RU size may be configured. For example, an RU size of 52 tones may be reserved or allocated for transmission of a 5 MHz bandwidth 802.11ba signal. The 802.11ba PPDU sequences and 802.11ax QAM symbols may also be multiplexed in the frequency domain by using OFDM transmission.

The 802.11ba PPDU generated using CP-OFDM may benefit by utilizing shaping sequences and the sequences may utilize one or more allocated RUs for the 802.11ba PPDU. The 802.11ba PPDU preamble and 802.11ba PPDU payload may use different shaping sequences. Also, a technique different than OOK may be utilized for the 802.11ba preamble. Within a useful duration of OFDM, such as 12.8 µs, multiple shaped signals may be utilized and the shaped signals may be OOK symbols with or without coding, such as Manchester coding.

Figure 7:
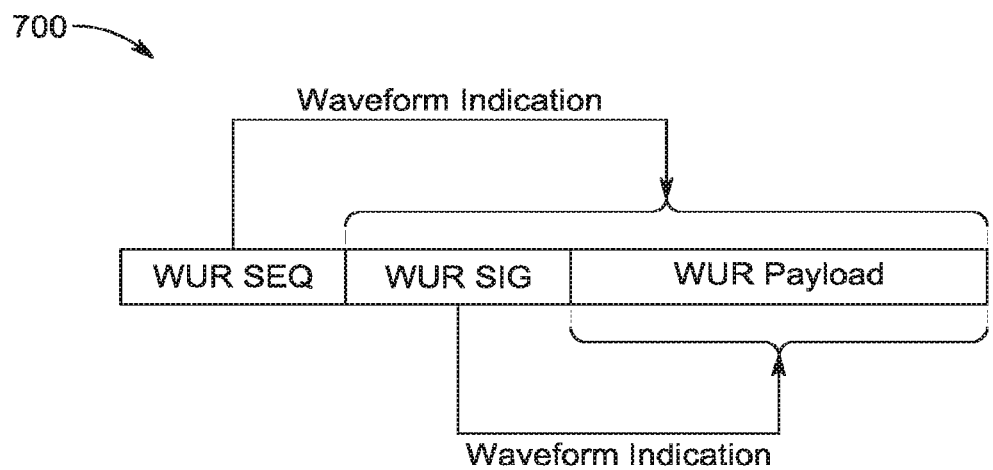
FIG. 7 is an example waveform or PPDU type indication for an 802.11ba PPDU.

FIG. 7 is an example waveform or PPDU type indication for an 802.11ba PPDU 700 where a WUR preamble sequence (SEQ) and WUR signal (SIG) field may be utilized as waveform indications for a WUR payload. For coexistence with 802.11ax, OFDMA transmission of a waveform with sequence-based OOK symbols or a standalone WUR transmission with OOK symbols and masking may be utilized. For WUR transmission, the WUR preamble SEQ may distinguish different PPDU or waveform formats. In 700, the WUR preamble SEQ may indicate the waveform of the WUR SIG field and/or WUR payload. In certain configurations, the WUR SEQ may be the same as the WUR SIG. Also, in certain configurations, the WUR SIG may indicate the waveform of the WUR payload.

In the examples given herewith, an 802.11ba receiver may receive and process non-coexistence configuration or coexistence configuration, scan configured channels for coexistence and non-coexistence preambles, and identify the coexistence preamble. The 802.11ba receiver may also remove overhead from the signal or skip unrelated samples (e.g., CP, GI), and perform energy detection, envelope detection, correlation, or the like. Multiple shaped symbols with DFT-based shaping sequences may be utilized for construction of coexistence signals. To multiplex 802.11ax and 802.11ba information within an OFDM symbol length, 802.11ax OFDM symbols may include multiple shaped signals in time by utilizing a set of reserved or designated subcarriers in one OFDM symbol. A shaped signal may be an OOK signal that may be transmitted without coding or Manchester encoded to reduce the complexity of the WUR receiver.

Figure 8:
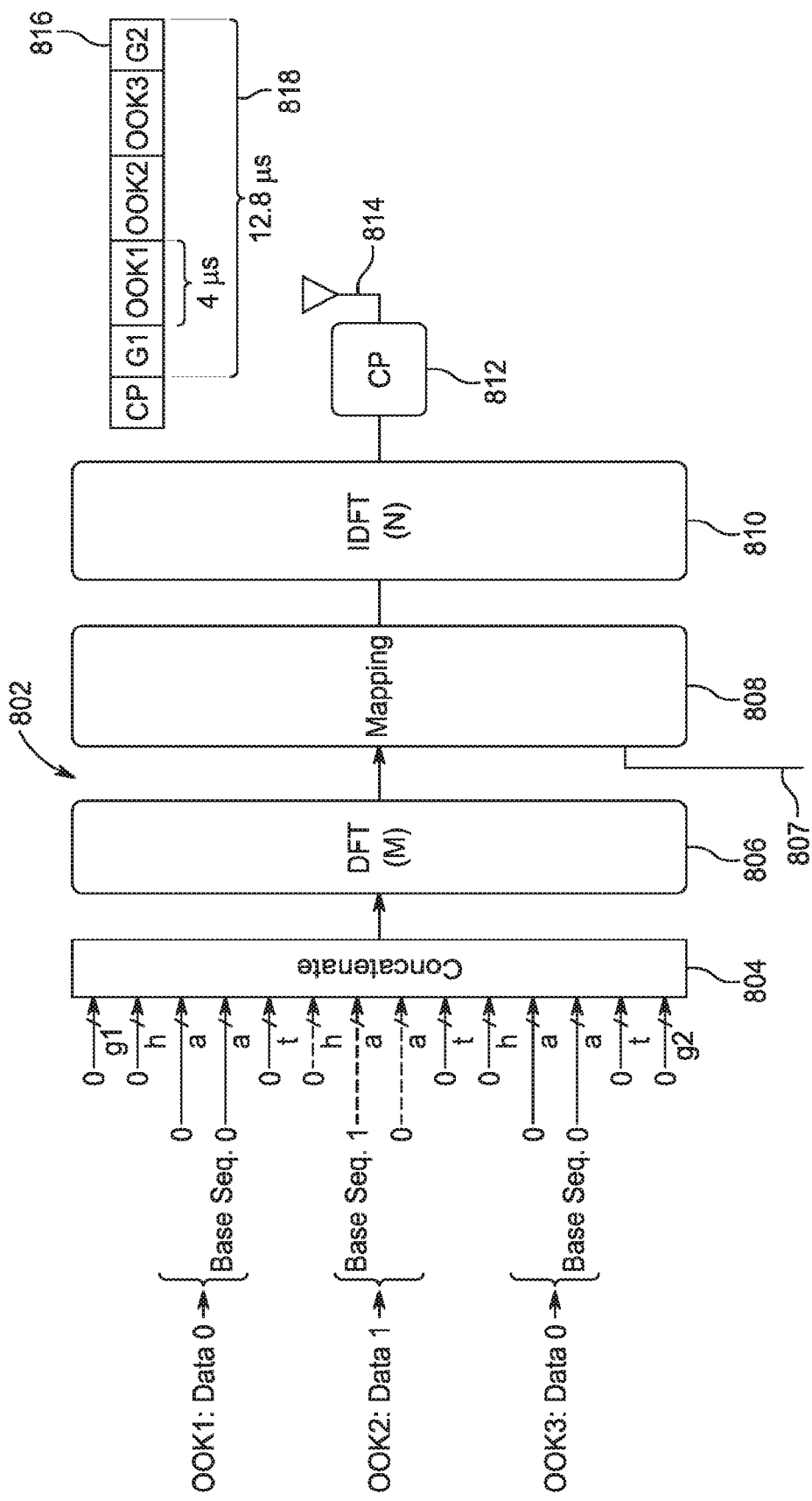
FIG. 8 is an example of multiple on-off keying (OOK) symbol generation with discrete Fourier transform (DFT)-based shaping sequences.

FIG. 8 is an example of multiple OOK symbol generation with DFT-based shaping sequences. Transmitter 802 may be configured to transmit an 802.11ba PPDU, which includes preamble and data, utilizing CP OFDM. In this example, OOK1 symbol may be data0 (or bit "0"), OOK2 symbol may be data1 (or bit "1"), and OOK3 symbol may be data0 (or bit "0") to be generated with one DFT sequence as $$d_{3\times OOK} = D \begin{bmatrix} 0_{g_1 \times 1} \\ s_{ook1} \\ s_{ook2} \\ s_{ook3} \\ 0_{g_2 \times 1} \end{bmatrix}. \qquad \text{Equation (1)}$$

Variables $g_1$ and $g_2$ may be a number of zeros for padding, that may be indicated by the AP to the primary or 802.11ba radio. The OOK symbols may be given as $$s_{ook1} = \begin{bmatrix} 0_{h \times 1} \\ 0_{a \times 1} \\ s_{base0} \\ 0_{t \times 1} \end{bmatrix}, s_{ook2} = \begin{bmatrix} 0_{h \times 1} \\ s_{base1} \\ 0_{a \times 1} \\ 0_{t \times 1} \end{bmatrix}, s_{ook3} = \begin{bmatrix} 0_{h \times 1} \\ 0_{a \times 1} \\ s_{base0} \\ 0_{t \times 1} \end{bmatrix}, \qquad \text{Equation (2)}$$

where α=(M−h−t)/2, and M is the DFT size, where h and t are non-negative integers. In one configuration, $g_1$ or $g_2$ may be set to zero to simplify reception. The sequence of three OOK symbols $d_{3 \times OOK}$ may be assembled by concatenate component 804, converted to the frequency domain by DFT component 806 having DFT size M, and mapped or multiplexed with other 802.11 information, data, or control 807 by mapping component 808. The output of mapping component 808 may be processed by IDFT component 810 of length N and a cyclic prefix added by CP component 812 prior to transmission by antenna 814. In a configuration, mapping component 808 may multiplex 802.11ba with other QAM symbols, which may be for 802.11ax STAs, in frequency.

Numerology parameters for OOK symbols may be chosen based on 802.11ax numerology where the CP size may be flexible. For different OOK symbols, base sequences may be the same, different, orthogonal to each other, have low cross correlation, or the like. IDFT component 810 may receive three different sequences for DFT-based shaping to generate OOK symbols which may include Manchester coding. Information 816 may comprise a 0.8 μs CP, 1.6 μs CP, or 3.2 μs CP, guard interval G1, OOK1 data of duration 4 μs, OOK2 data of duration 4 μs, OOK3 data of duration 4 μs, and guard interval G2 for a total duration of 12.8 μs (818) without the CP.

Since in 802.11ax communication CP duration may be 0.8 μs, 1.6 μs, or 3.2 μs, an 802.11ba receiver may need a signaled indication of the CP duration to detect symbol shape, to correlate the sequence known a priori, to obtain a synchronization point, or the like. A WUR STA may also blindly determine or estimate CP duration. Estimating CP length may be achieved with a preamble based CP indication, CP indication based on transmitter/receiver capability exchanges, the use of a fixed CP level, CP indication sequences in OFDM symbols, or the like. In FIG. 8, duration or lengths 0.8 μs, 1.6 μs, or 3.2 μs are given as examples and any duration may be configured or utilized to meet desired performance or functions.

Figure 9:
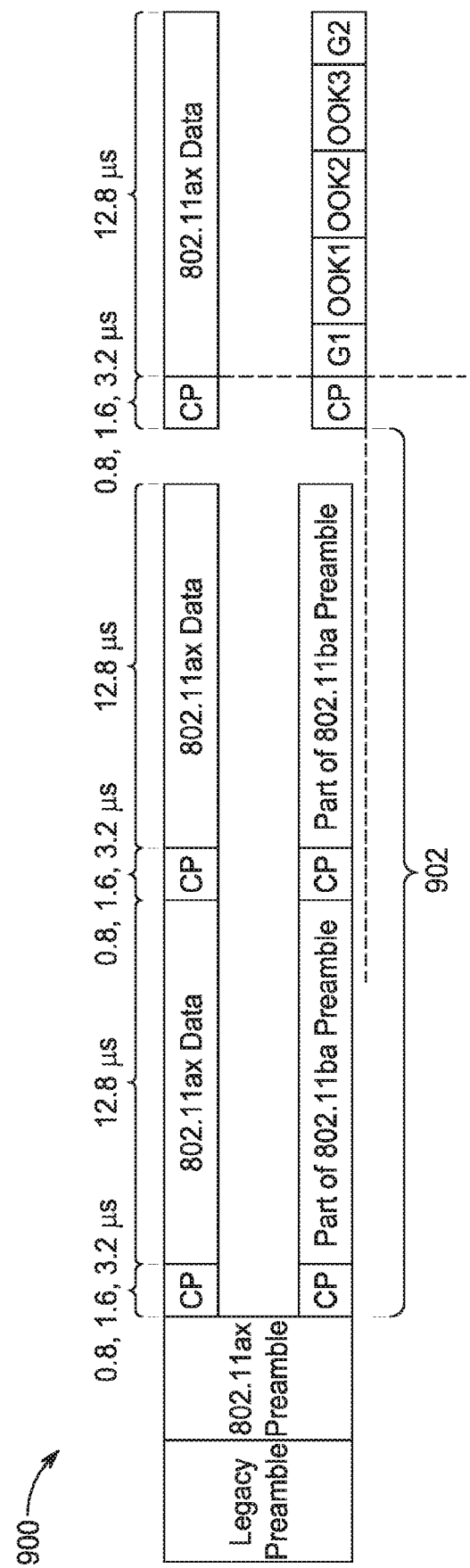
FIG. 9 is an example of an 802.11ba PPDU on 802.11ax RUs and a cycle prefix (CP) indicating preamble.

FIG. 9 is an example of an 802.11ba PPDU on 802.11ax RUs and a CP indicating preamble. The format for 900 may be configured similar to that in 600. In 900, an 802.11ba preamble 902 may indicate CP duration for an 802.11ba PPDU on 802.11ax RUs. CP duration may be indicated by specific sequences in useful OFDM duration for the preamble, repeating a different number of repetition rates of the seed sequence, mapping a different repetition rate to different CP durations or OFDM symbol durations, or by the sequences in the preamble utilizing RUs allocated for 802.11ba.

Figure 10:
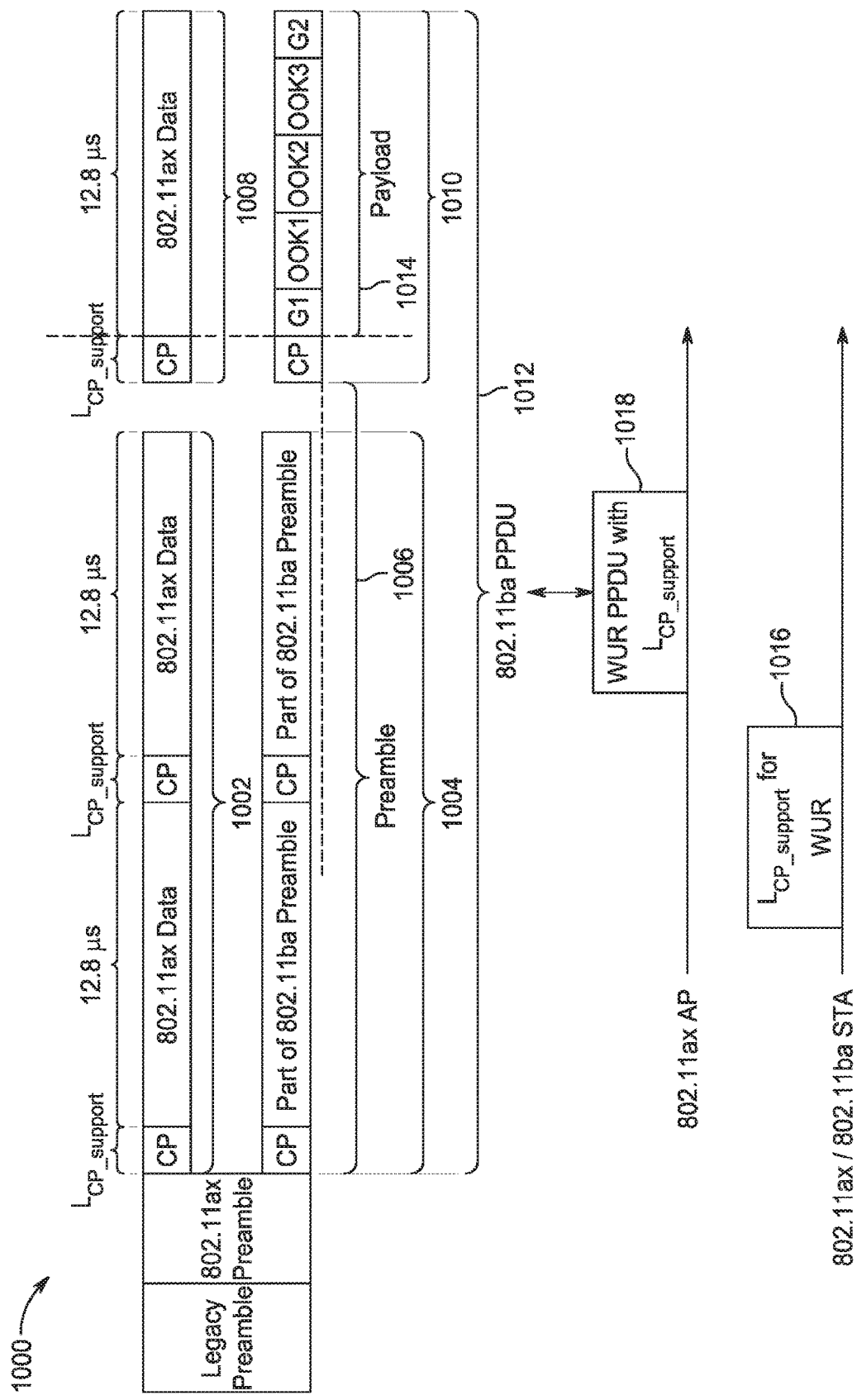
FIG. 10 is an example of CP duration information exchange between an 802.11ax/ba STA and 802.11ax AP.

In FIG. 10, an example of CP duration information exchange 1000 between an 802.11ax/ba STA and 802.11ax AP is given. To decrease receiver complexity for 802.11ba, a configuration for CP capability for 802.11ba to 802.11ax may be utilized. A primary radio on the 802.11ba-capable STA or 802.11ax STA, may send the supported CP duration for its WUR, i.e., $L_{CP\_support}$ 1016 before entering a sleep or idle mode. An 802.11ax AP may store $L_{CP\_support}$ in memory and send the 802.11ba PPDU 1018, as shown in detailed 802.11ba PPDU 1012, by utilizing an OFDM symbol with the CP duration of $L_{CP\_support}$ in PPDU portions 1002, 1004, and 1008. In detailed 802.11ba PPDU 1012, preamble 1006 may be associated with payload 1014 having OOK symbols and guard bands 1010.

Figure 11:
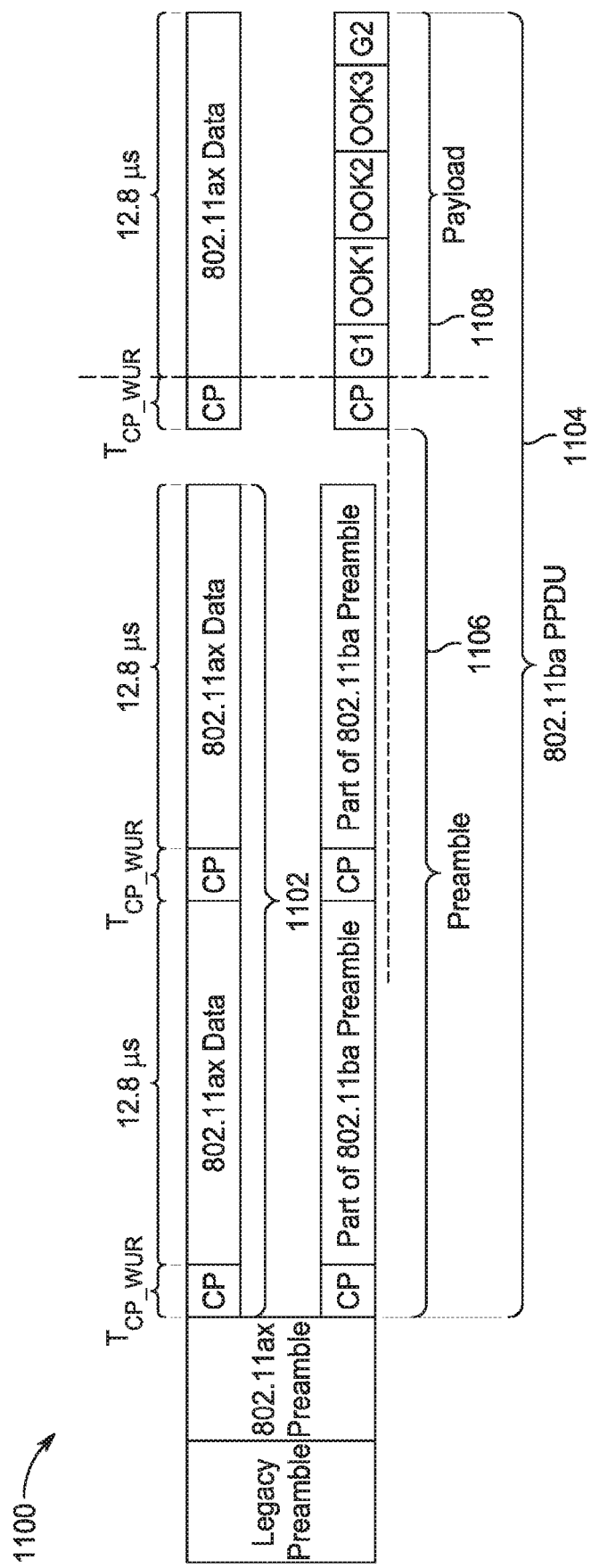
FIG. 11 is an example of a fixed CP in a transmission.

FIG. 11 is an example of a fixed CP in a transmission 1100 where $T_{CP\_WUR}$ may be any one of 0.8 μs, 1.6 μs, or 3.2 μs. Transmission 1100 may include 802.11ax portion 1102 and 802.11ba PPDU 1104 having preamble 1106 and payload 1108. In certain configurations, $T_{CP\_WUR}$ samples may be prepended as a CP and a receiver may skip the CP region.

Figure 12:
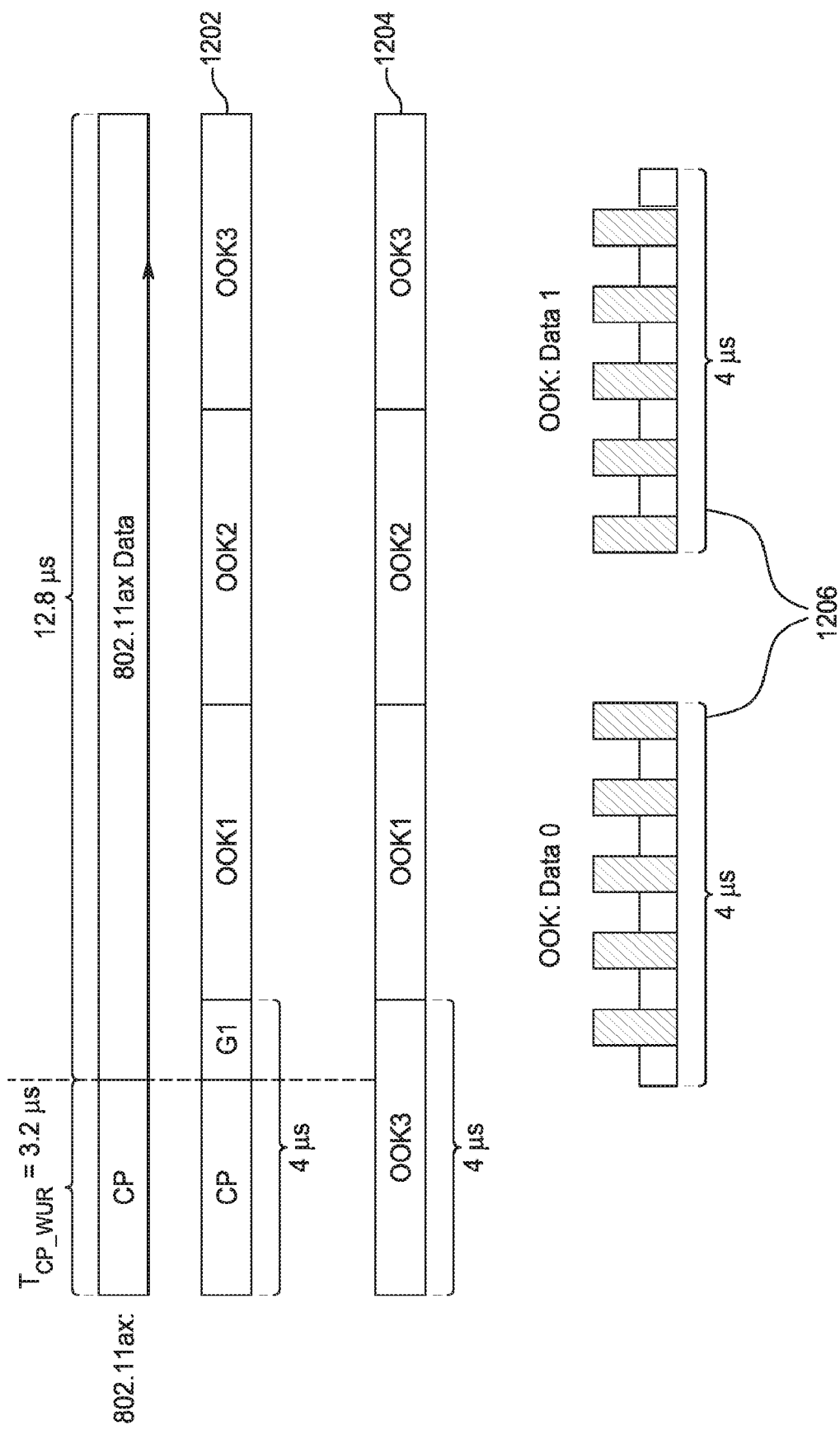
FIG. 12 is an example of two fixed CP transmissions where OFDM symbol duration is an integer multiple of OOK symbol duration.

FIG. 12 is an example of two fixed CP transmissions where OFDM symbol duration may be configured as an integer multiple of OOK symbol duration. For FIG. 12, when $T_{CP\_WUR}$=3.2 μs, in frame or packet 1202 a guard interval G1 may be configured between CP and OOK symbols. CP duration $T_{CP\_WUR}$ may also be fixed to a certain value such that an OFDM symbol duration including CP $T_{OFDM}$ is integer multiple of OOK symbol duration $T_{OOK}$. In 1204, and as shown in 1206, every $$\frac{T_{OFDM}}{T_{OOK}} = 2$$

other symbols may be the same. In this configuration, 4 OOK symbols may be configured for a duration of 16 μs and the first and fourth OOK symbols may be the same. In this configuration, OOK symbols may remain on the same subcarriers after passing through a multipath channel.

Furthermore, OOK symbols may have $T_{OOK}/(T_{OOK}-T_{CP\_WUR})$ repetitions to meet certain CP configurations of OFDM. For example, there may be $$\frac{T_{OOK}}{(T_{OOK} - T_{CP_{WUR}})} = 5 CPs$$

for data 0 and data 1. An 802.11ba STA may search for a sequence used as an 802.11ba frame or packet preamble, and start to decode the frame or packet if a valid 802.11ba frame or packet preamble is detected. This operation may be performed without utilizing a L-preamble, L-SIG field, HE preamble, or any non-WUR preamble. Also, at reception in certain configurations the 802.11ba STA may assume that the CP for WUR packet or frame symbols is fixed.

Figure 13:
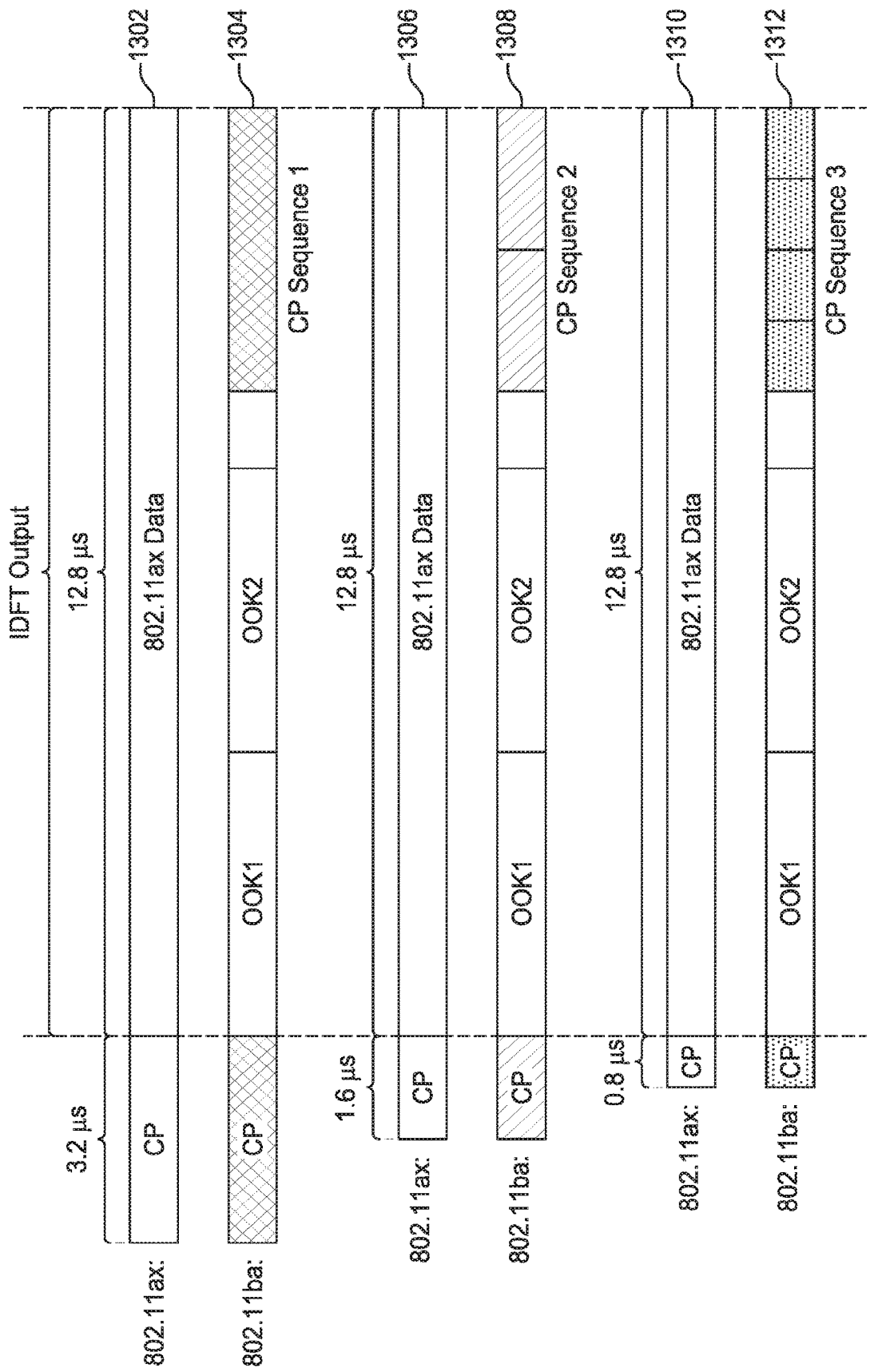
FIG. 13 is an example for CP indication sequences.

FIG. 13 is an example for CP indication sequences. When configuring a CP for 802.11ax and 802.11ba concurrent signals, a set of specific sequences may be utilized at the start or end of the OFDM symbol to allow the 802.11ba receiver to blindly estimate the CP duration or length. These sequences may be orthogonal or quasi-orthogonal to each other. For example, in signals 1302 and 1304, when as an example CP duration is configured as 3.2 μs and IDFT duration or length is 12.8 μs, 1×CP sequence 1 may be utilized for the 802.11ba transmission with OOK symbols within one OFDM symbol. In signals 1306 and 1308, when as an example CP duration is 1.6 μs, 2×CP sequence 2 may be utilized for the 802.11ba transmission with OOK symbols within one OFDM symbol. In signals 1310 and 1312, when as an example CP duration is 0.8 μs, 3×CP sequence 3 may be utilized for the 802.11ba transmission with OOK symbols within one OFDM symbol.

Figure 14:
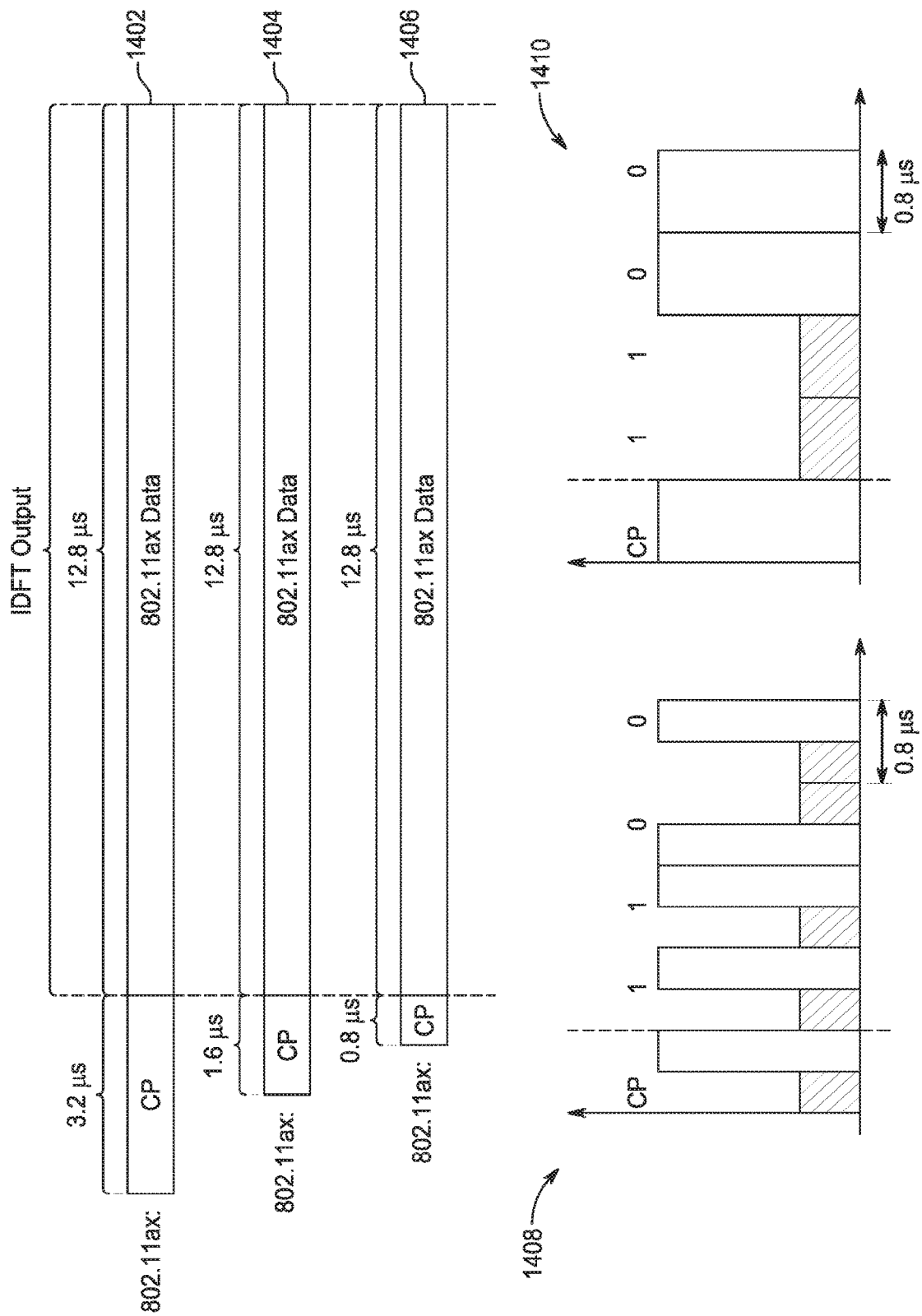
FIG. 14 is an example of calculating OOK symbol duration based on 802.11ax OFDM symbols.

FIG. 14 is an example of calculating OOK symbol duration based on 802.11ax OFDM symbols. In 802.11ax, three OFDM symbol durations may be configured for 3 different CP lengths or durations for packets or frames 1402, 1404, and 1406. For orthogonality or quasi-orthogonality of an 802.11ba symbol, an OOK symbol duration may be configured as a common divisor of possible OFDM symbol durations. For example, 802.11ax may utilize durations $T_{OFDM1}$=16, $T_{OFDM1}$=14.4, or $T_{OFDM1}$=13.6 μs as in FIG. 14. In this configuration, the OOK symbol duration may be configured to satisfy condition:

$$T_{OOK} = \frac{T_{OFDM1}}{k} = \frac{T_{OFDM2}}{l} = \frac{T_{OFDM3}}{m} \qquad \text{Equation (3)}$$

where k, l, m $\in \mathbb{Z}$. For example, when $T_{OOK}$=0.8 μs, k, l, m may be 20, 18, or 17. Hence, $T_{OOK}$=0.8 μs may result in possible OFDM symbol durations that have integer multiples of OOK symbols with minimal residual. The CP part of an 802.11ax OFDM symbol may include a plurality of OOK waveforms that may represent coded bits or uncoded bits. For example, if $T_{OOK}$=0.8 μs, the CP part may include one symbol in time with Manchester coding (1408) and without coding (1410).

Figure 15:
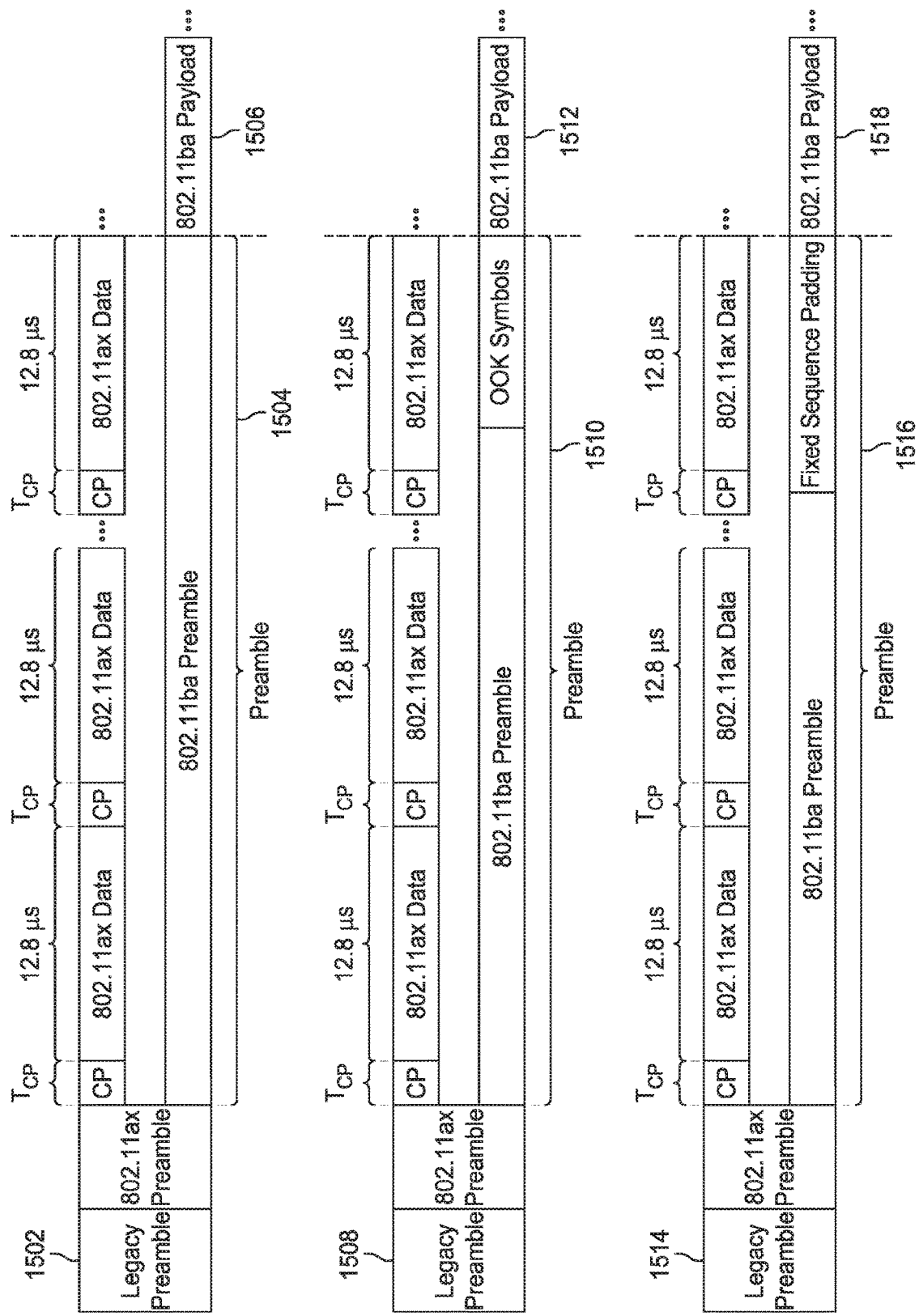
FIG. 15 is an example of flexible preamble construction.

FIG. 15 is an example of flexible preamble construction. An 802.11ba preamble may span one or multiple OFDM symbols. With a number of symbols spanned and possible residual time at the end of the OFDM symbol it may be desirable to configure a specific 802.11ba preamble. In signal 1502, 802.11ba payload 1506 may include 802.11ba preamble 1504 that spans integer multiples of 802.11ax symbols such as k×$T_{OFDM}$. When an OOK preamble is $T_{preamble}$<k×$T_{OFDM}$, in signal 1508 a transmitter may add one or more OOK symbols at the end of 802.11ba preamble 1510. The additional OOK symbols may ensure payload alignment with the next OFDM symbol subsequent to 802.11ba payload 1512. Signal 1508 may be configured with a preamble size that is a multiple of the OOK symbol size $T_{OOK}$ to ensure that left-over space fits an OOK symbol. If $T_{preamble}$−k×$T_{OFDM}$≠m×$T_{OOK}$, m, k $\in \mathbb{Z}$, for signal 1514 a STA or transmitter may pad a fixed sequence or zeros to 802.11ba preamble 1516 for 802.11ba payload 1518 such that duration or length is k×$T_{OFDM}$.

Figure 16:
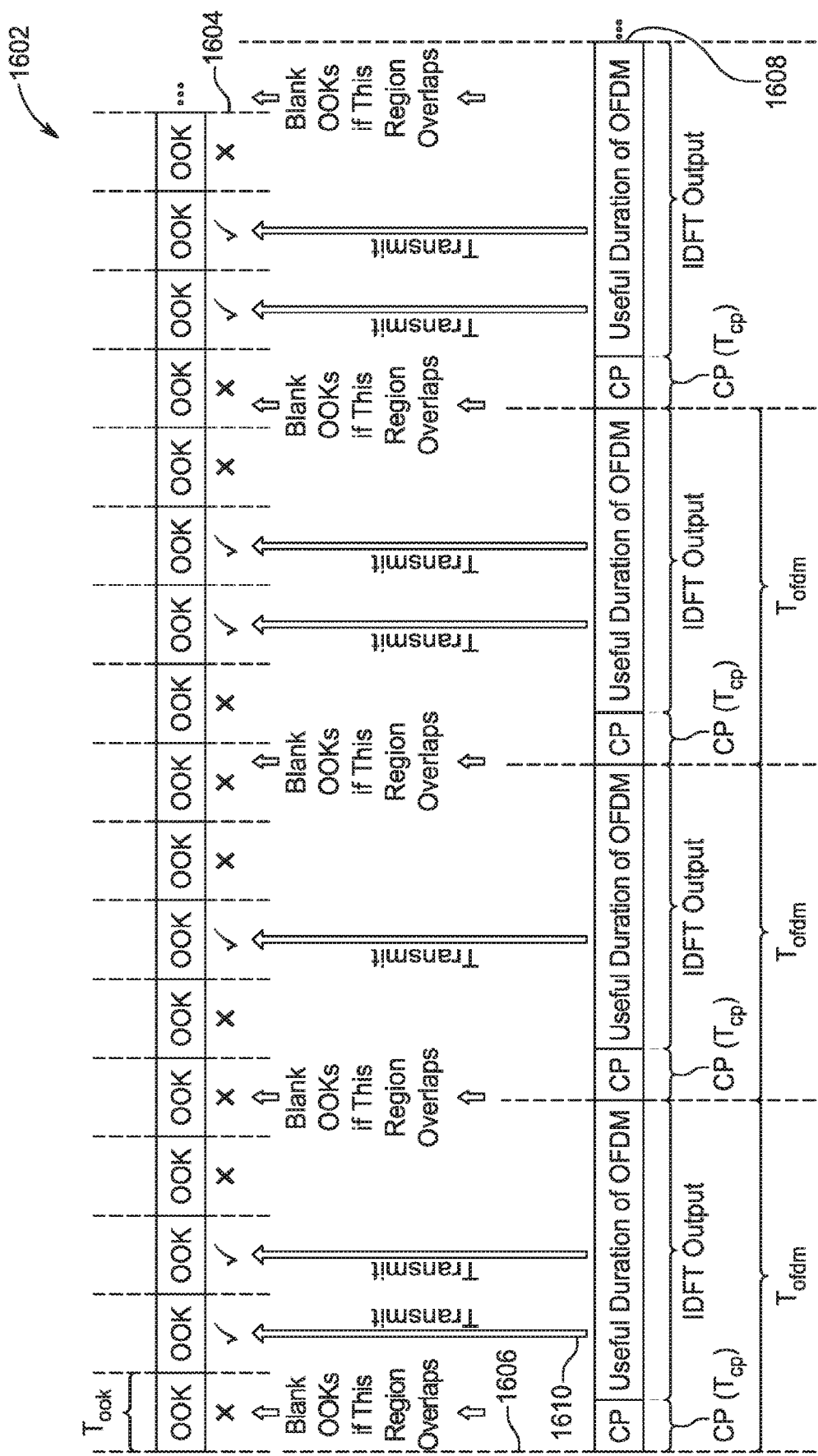
FIG. 16 is an example of utilizing blank-symbols with OOK symbols.

FIG. 16 is an example of utilizing blank-symbols with OOK symbols 1602. A sequence at the input of a DFT may be modulated to shift shaped symbols, such as OOK symbols, cyclically in time such that the shaped symbols fall into the non-CP region of an OFDM symbol. Non-CP region may be the part of an OFDM symbol which excludes the CP portion and the portion may be utilized to generate the CP of OFDM symbol. For example, the shaped symbol duration, such as 4 μs, and the cyclic prefix related portions of CP-OFDM may be configured without a shaped symbol (1604). If shaped symbols, such as OOK symbols with or without Manchester coding, fall into or overlap a region in the CP duration of an OFDM symbol or the duration where a CP is generated in an OFDM symbol, no data may be transmitted in the OOK symbol (1606).

When the shaped symbol duration for 802.11ba is configured as $T_{ook}$, and in signal 1608 $T_{cp}$ and $T_{useful}$ is the CP and useful duration of OFDM symbol, respectively, shaped symbols may be spaced apart with $T_{ook}$. In FIG. 16 the OFDM symbol duration may be represented as $T_{ofdm}$=$T_{cp}$+$T_{useful}$. In this configuration, the grid spacing for an OOK symbol may be $T_{ook}$ and the grid spacing for OFDM may be $T_{ofdm}$. In 1602, OOK symbols that do not fall in or that are outside CP-related durations of an OFDM symbol, may be transmitted 1610 as indicated in pattern 1604. OOK symbols may be generated with a set of subcarriers, a sequence generated through DFT operation with a circular shift operation, using a sequence table, or the like. A sequence table may include a DFT-based sequence or a combination of the sequences (807).

Figure 17:
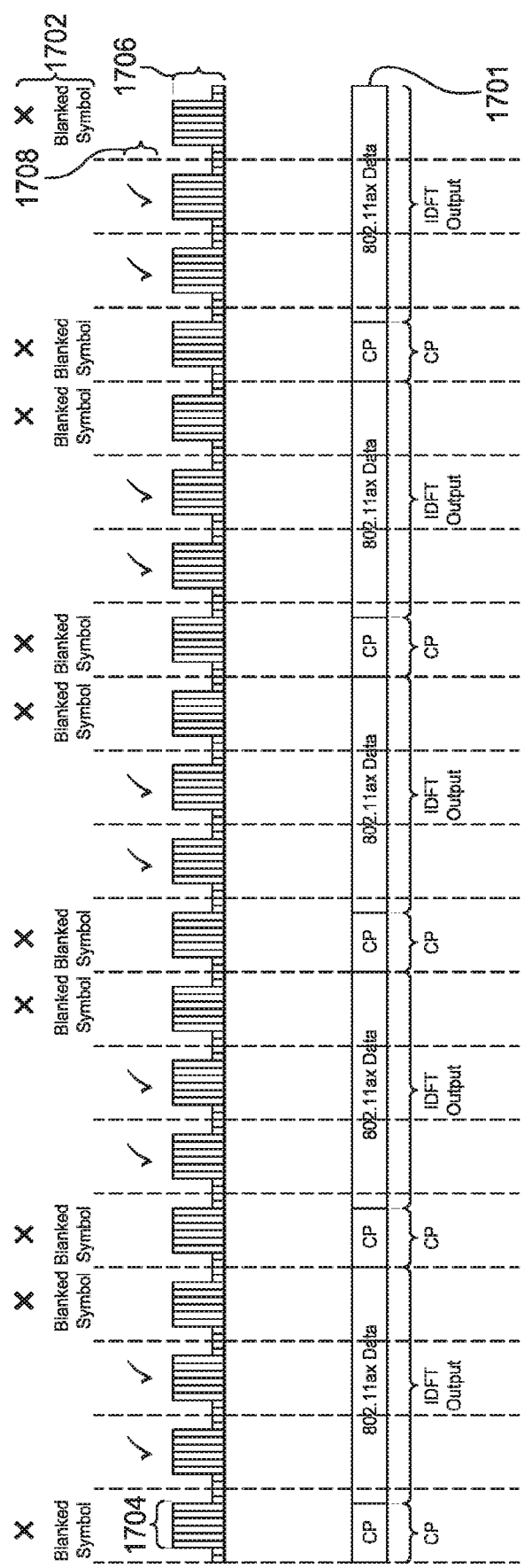
FIG. 17 is an example of utilizing blank-symbols with 802.11ax OFDM symbols.

FIG. 17 is an example of utilizing blank-symbols with 802.11ax OFDM symbols 1701. The duration or length of 802.11ax OFDM symbols 1701 may be configured as 16 μs or any other value configured based on desired performance. Blanked-symbols 1702 may be configured with parameters $T_{ook}$=4 μs, $T_{cp}$=3.2 μs, and $T_{useful}$=12.8 μs. Area 1704 in each symbol may indicate an energy region with or without waveform coding. OOK symbols 1706 may be generated with or without Manchester coding and shaped. In FIG. 17, the first OOK symbol may be skipped or blanked for a transmission. OOK symbols may then be transmitted with the pattern of {2 OOK, 2 blanked OOK} as indicated by 1708. A receiver receiving OOK symbols 1706 may discard the first OOK symbol and follow the pattern indicated by 1708 to detect symbols: {2 accept, 2 discard}.

Figure 18:
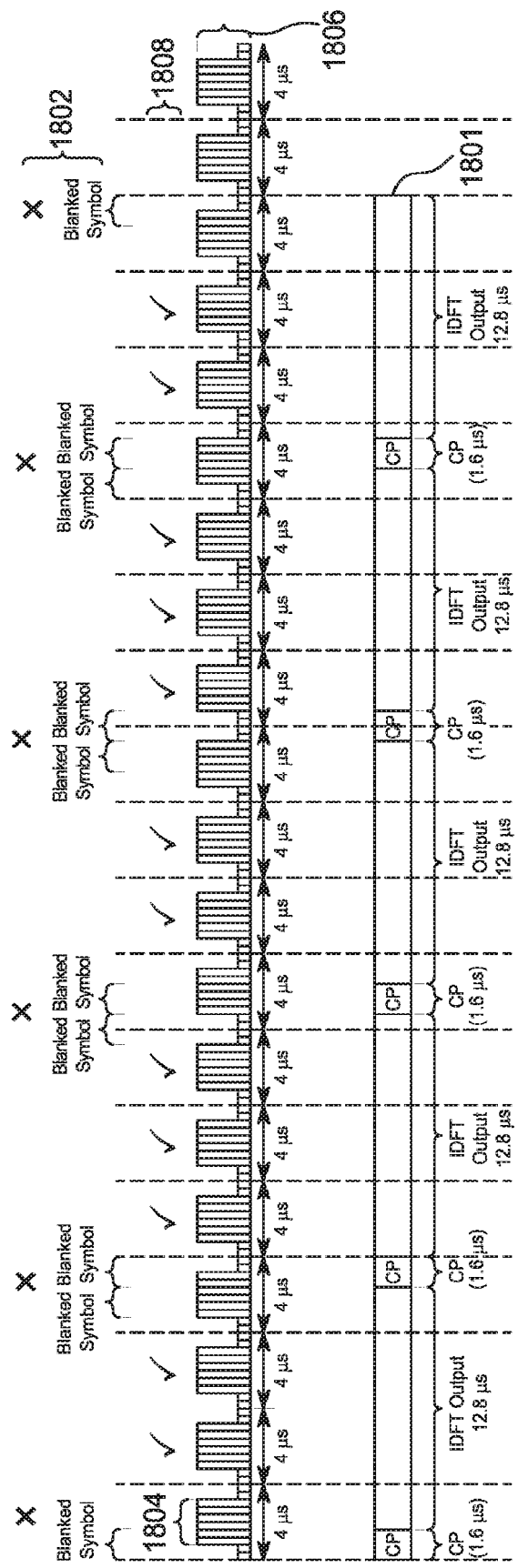
FIG. 18 is an example of utilizing blank-symbols for an inverse discrete Fourier transform (IDFT) output.

FIG. 18 is an example of utilizing blank-symbols for an IDFT output 1801. The duration or length of IDFT output 1801 may be configured as 14.4 μs or any other value configured based on desired performance. Blank-symbols 1802 may be configured with parameters $T_{ook}$=4 μs, $T_{cp}$=1.6 μs, and $T_{useful}$=12.8 μs. Area 1804 in each symbol may indicate an energy region with or without waveform coding. OOK symbols 1806 may be generated with or without Manchester coding and shaped. In FIG. 18, the first OOK symbol may be skipped or blanked for a transmission. OOK symbols may then be transmitted with the pattern of {2 OOK, 1 blanked OOK, 3 OOK, 1 blanked OOK} as indicated by 1808. A receiver receiving OOK symbols 1806 may discard the first OOK symbol and follow the pattern to detect symbols: {2 accept, 1 discard, 3 accept, 1 discard}.

Figure 19:
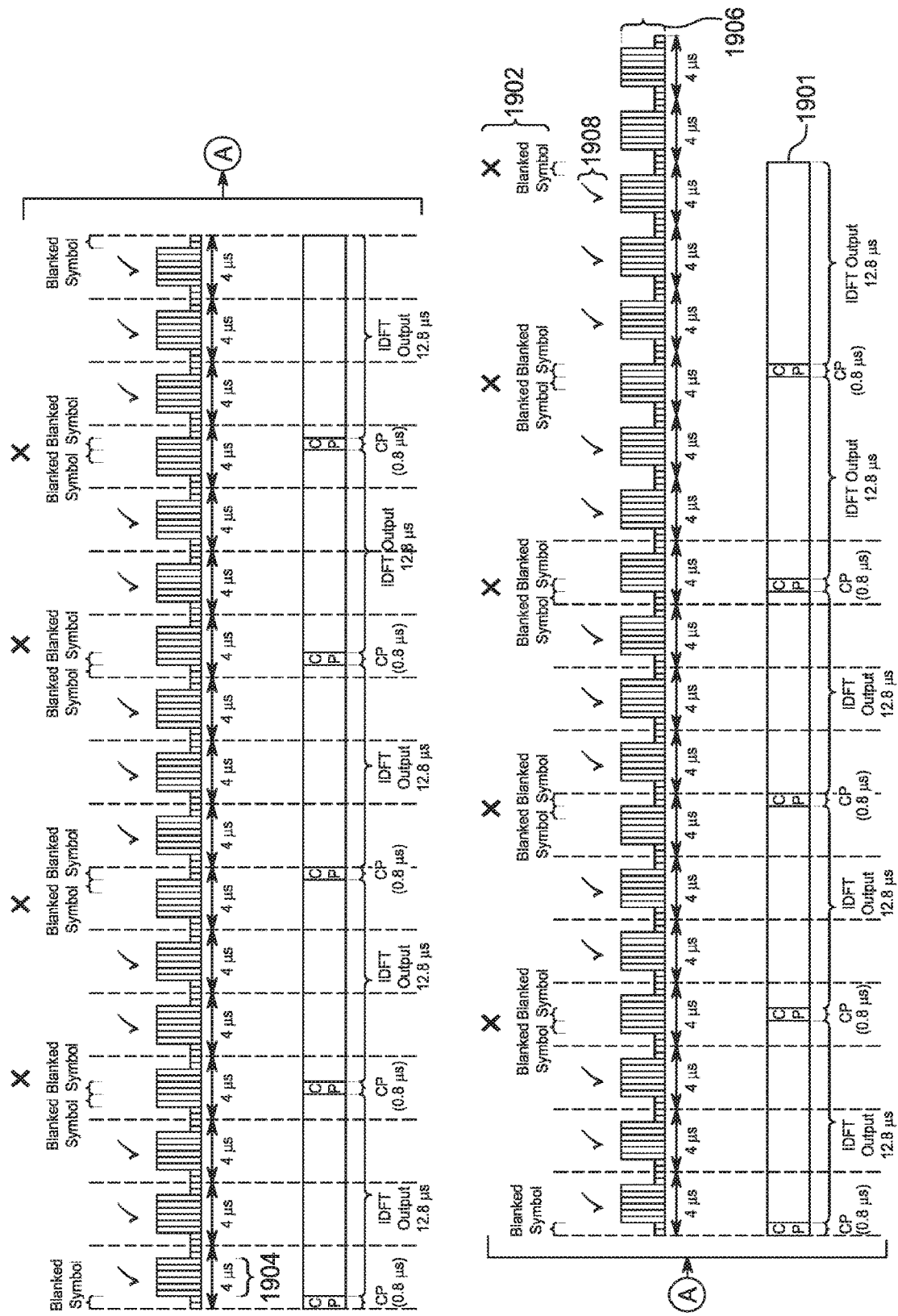
FIG. 19 is an example of utilizing blank-symbols for an IDFT output with a given duration.

FIG. 19 is an example of utilizing blank-symbols with a 13.6 μs duration for an IDFT output 1901. The duration or length of IDFT output 1901 may be configured as 13.6 μs or any other value configured based on desired performance. Blank-symbols 1902 may be configured with parameters $T_{ook}$=4 μs, $T_{cp}$=0.8 μs, and $T_{useful}$=12.8 μs. Area 1904 in each symbol may indicate an energy region with or without waveform coding. OOK symbols 1906 may be generated with or without Manchester coding and shaped. In the example, the transmitter may transmit first 3 OOK symbols. OOK symbols may be transmitted with the pattern of {1 blanked OOK, 2 OOK, 1 blanked OOK, 3 OOK, 1 blanked OOK, 2 OOK, 1 blanked OOK, 6 OOK} as indicated by 1908. A receiver receiving OOK symbols 1906 may accept the first 3 OOK symbol and follow the pattern to detect the symbol: {1 discard, 2 accept, 1 discard, 3 accept, 1 discard, 2 accept, 1 discard, 6 accept}.

In the examples given herein, the transmission pattern or sequence of OOK symbols may be configured to be known at a receiver or STA prior to communication. When the transmission pattern is setup prior to transmission, an AP may signal the OOK transmit pattern by using an OOK signal or through a control channel to a STA. The transmission pattern may be configured as a function of OOK and OFDM symbol structures. In addition, the transmission pattern may be blindly estimated at a STA, fixed, based on a CP duration, indicated in a table, or the like.

An STA may set the transmission pattern of a WUR receiver or STA based on the received transmission pattern. A WUR STA or receiver may discard or accept an OOK symbol based on the transmission pattern. When the pattern is signaled during the transmission, sequences for different patterns may be pre-defined. An AP may signal or indicate the OOK transmission pattern by embedding a sequence to the WUR preamble. The WUR STA or receiver may estimate the sequence and discard or accept OOK symbols based on the detected pattern.

When a transmission pattern is blindly estimated by a WUR receiver or STA, an AP may construct the WUR packet by completely or almost completely blanking the CP duration of an OFDM symbol or the duration where CP is generated in an OFDM symbol. In this configuration, a WUR receiver or STA may estimate discarded or valid OOK symbols by utilizing the waveform coding structure of OOK symbols.

In the examples given herein, for each OFDM symbol duration, a different number of shaped signals and symbols such as 1, or 2, 3 OOK symbols, may be generated and the location of OOK symbols may be a function of a transmission pattern. A STA or transmitter may utilize a complex phase rotation in frequency to adjust the position of OOK symbols or the input of the DFT may be circularly shifted. In addition, the sequences for all combinations may be generated and stored and called from memory to generate OOK symbols. For 802.11ax, QAM data and the sequences for blanked-symbol approach may be multiplexed in frequency.

In another configuration, a part of a WUR signal may be located in the guard bands or on the direct current (DC) tones of the OFDM transmission of 802.11ax. Since these subcarriers may be unutilized or underutilized by an 802.11ax STA, and transmitting a WUR PPDU in these subcarriers may increase efficiency.

Figure 20:
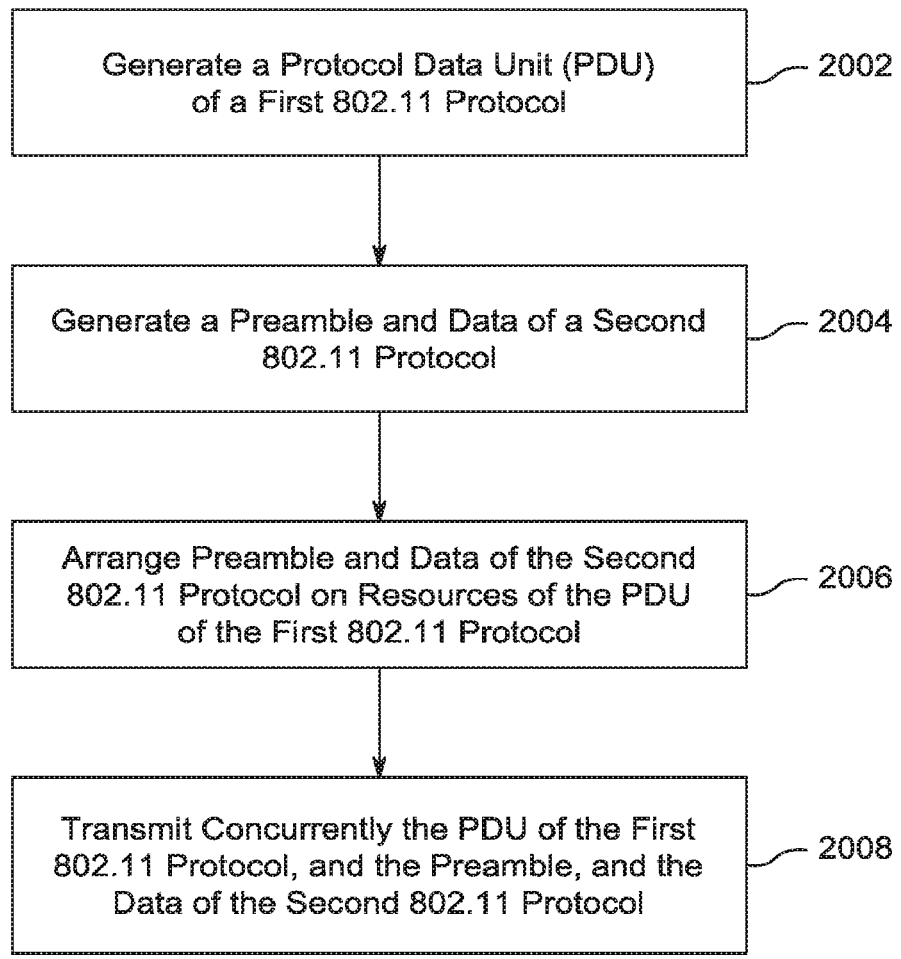
FIG. 20 is an example of concurrent transmission of at least two types of 802.11 information.

FIG. 20 is an example of concurrent transmission of at least two types of 802.11 information. A PDU of a first 802.11 protocol may be generated (2002) and a preamble and data of a second 802.11 protocol may be generated (2004). The preamble and data of the second 802.11 protocol may be arranged on resources of the PDU of the first 802.11 protocol (2006). The PDU of the first 802.11 protocol, the preamble, and the data of the second 802.11 protocol may be transmitted concurrently (2008).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A station (STA) comprising:
  a processor and a transmitter configured to transmit a first 802.11 protocol data unit (PDU) including a first cyclic prefix (CP) portion;
  the processor and the transmitter configured to transmit a second 802.11 protocol PDU concurrently with the transmission of the first 802.11 PDU, the second 802.11 protocol PDU including a second CP portion, wherein the transmission of the first 802.11 protocol PDU and the transmission of the second 802.11 protocol PDU are at least quasi-orthogonal based on a length of the first CP portion and a length of the second CP portion.

2. The STA of claim 1, wherein the second 802.11 protocol PDU is transmitted by the STA completely within one or more resource units (RUs) of the first 802.11 protocol PDU.

3. The STA of claim 1, wherein the first 802.11 protocol PDU is an 802.11ax physical layer convergence procedure (PLCP) PDU (PPDU).

4. The STA of claim 1, wherein the second 802.11 protocol PDU is an 802.11ba physical layer convergence procedure (PLCP) PDU (PPDU).

5. The STA of claim 1, wherein the processor is further configured to determine shaping sequences such that a time domain response of OOK symbols of the second 802.11 protocol PDU includes a plurality of on-off-keying (OOK) symbol subsequent to the second CP portion.

6. The STA of claim 1, the processor is further configured to blank an OOK symbol included in the second 802.11 protocol PDU.

7. A method performed by a station (STA), the method comprising:
  transmitting, by the STA, a first 802.11 protocol data unit (PDU) including a first cyclic prefix (CP) portion; and
  transmitting, by the STA, a second 802.11 protocol PDU concurrently with the transmission of the first 802.11 PDU, the second 802.11 protocol PDU including a second CP portion, wherein the transmission of the first 802.11 protocol PDU and the transmission of the second 802.11 protocol PDU are at least quasi-orthogonal based on a length of the first CP portion and a length of the second CP portion.

8. The method of claim 7, wherein the second 802.11 protocol PDU is transmitted by the STA completely within one or more resource units (RUs) of the first 802.11 protocol PDU.

9. The method of claim 7, wherein the first 802.11 protocol PDU is an 802.11ax physical layer convergence procedure (PLCP) PDU (PPDU).

10. The method of claim 7, wherein the second 802.11 protocol PDU is an 802.11ba physical layer convergence procedure (PLCP) PDU (PPDU).

11. The method of claim 7, further comprising the STA determining shaping sequences such that a time domain response of OOK symbols of the second 802.11 protocol PDU includes a plurality of on-off-keying (OOK) symbol subsequent to the second CP portion.

12. The method of claim 7, further comprising the STA blanking an OOK symbol included in the second 802.11 protocol PDU.

13. The STA of claim 1, wherein the STA is an access point (AP)-STA.

14. The method of claim 7, wherein the STA is an access point (AP)-STA.

15. The STA of claim 1, wherein the first 802.11 protocol PDU and the second 802.11 protocol PDU are transmitted in a same 20 MHz channel.

16. The method of claim 7, wherein the first 802.11 protocol PDU and the second 802.11 protocol PDU are transmitted in a same 20 MHz channel.

* * * * *